United States Patent
Elshafie et al.

(10) Patent No.: US 12,557,022 B2
(45) Date of Patent: Feb. 17, 2026

(54) WAKE-UP SIGNAL FOR NON-DATA SERVICES

(71) Applicant: QUALCOMM Incorporated, San Diego, CA (US)

(72) Inventors: Ahmed Elshafie, San Diego, CA (US); Marwen Zorgui, San Diego, CA (US); Huilin Xu, Temecula, CA (US); Yuchul Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 513 days.

(21) Appl. No.: 18/147,660

(22) Filed: Dec. 28, 2022

(65) Prior Publication Data

US 2024/0224184 A1    Jul. 4, 2024

(51) Int. Cl.
*H04W 52/02* (2009.01)

(52) U.S. Cl.
CPC ............................ *H04W 52/0235* (2013.01)

(58) Field of Classification Search
CPC ......... H04W 52/0235; H04W 52/0229; H04W 52/028; Y02D 30/70
See application file for complete search history.

(56) References Cited

U.S. PATENT DOCUMENTS

| | | | | |
|---|---|---|---|---|
| 11,195,072 | B1 * | 12/2021 | Wagner | G06K 7/10039 |
| 11,310,740 | B2 * | 4/2022 | Ang | H04W 76/28 |
| 2016/0203347 | A1 * | 7/2016 | Bartholomew | G06K 7/10158 340/539.23 |
| 2020/0059861 | A1 * | 2/2020 | Huang | H04W 72/0446 |
| 2020/0107249 | A1 * | 4/2020 | Stauffer | H04W 48/14 |
| 2020/0196244 | A1 * | 6/2020 | Zhang | H04W 52/0235 |
| 2022/0217636 | A1 * | 7/2022 | Shrivastava | H04L 1/1812 |
| 2022/0240191 | A1 * | 7/2022 | Bohrer | G01D 21/00 |
| 2022/0279445 | A1 * | 9/2022 | Shrivastava | H04W 52/0254 |
| 2023/0106904 | A1 * | 4/2023 | Ljung | H04W 64/003 455/456.1 |
| 2023/0345411 | A1 * | 10/2023 | Zhao | H04W 64/00 |
| 2024/0015655 | A1 * | 1/2024 | Cheng | H04L 27/2602 |

(Continued)

FOREIGN PATENT DOCUMENTS

| | | | | | |
|---|---|---|---|---|---|
| CN | 109803224 | A | * | 5/2019 | |
| CN | 109792686 | B | * | 5/2022 | ............ H04W 72/20 |

(Continued)

*Primary Examiner* — Sujoy K Kundu
*Assistant Examiner* — Vladislav Y Agureyev
(74) *Attorney, Agent, or Firm* — Satheesh Kumar Karra; Procopio, Cory, Hargreaves & Savitch LLP

(57) ABSTRACT

Aspects presented herein may improve the efficiency, latency, and power consumption of a UE performing non-data operations/service(s), such as RF sensing, UE positioning, and/or RFID processing, etc., as the UE may be triggered to perform the non-data operations/service(s) based on monitoring a low-power wake-up signal (LP-WUS) using a low-power wake-up radio (LP-WUR) circuitry. In one aspect, a UE monitors for an LP-WUS during one or more LP-WUS monitoring occasions, where at least one of the LP-WUS or the one or more LP-WUS monitoring occasions is associated with at least one non-data service. The UE performs the at least one non-data service in response to detecting the LP-WUS during the one or more LP-WUS monitoring occasions.

26 Claims, 24 Drawing Sheets

(56) References Cited

U.S. PATENT DOCUMENTS

| | | | |
|---|---|---|---|
| 2024/0098644 A1* | 3/2024 | Ye | H04W 52/0216 |
| 2024/0107533 A1* | 3/2024 | Hwang | H04W 68/02 |
| 2024/0163840 A1* | 5/2024 | Säily | H04L 25/0222 |
| 2024/0284456 A1* | 8/2024 | Elkotby | H04W 76/19 |
| 2024/0306115 A1* | 9/2024 | Wigard | H04W 68/005 |
| 2024/0322605 A1* | 9/2024 | Shrivastava | H02J 50/40 |
| 2024/0340791 A1* | 10/2024 | Li | H04W 52/0235 |
| 2024/0349231 A1* | 10/2024 | Zhao | H04L 5/0051 |
| 2024/0381317 A1* | 11/2024 | Hwang | H04W 52/0216 |
| 2025/0016677 A1* | 1/2025 | He | H04W 52/0235 |
| 2025/0056413 A1* | 2/2025 | Wang | H04W 52/02 |
| 2025/0106774 A1* | 3/2025 | He | H04W 52/0229 |
| 2025/0133502 A1* | 4/2025 | He | H04W 52/0235 |
| 2025/0266941 A1* | 8/2025 | Liu | H04L 27/2602 |
| 2025/0344155 A1* | 11/2025 | Jan | H04W 72/23 |

FOREIGN PATENT DOCUMENTS

| | | | | |
|---|---|---|---|---|
| CN | 116166326 A | * | 5/2023 | |
| CN | 117641567 A | * | 3/2024 | H04W 76/28 |
| CN | 117751632 A | * | 3/2024 | H04L 27/02 |
| CN | 118696574 A | * | 9/2024 | H04W 52/02 |
| CN | 119343966 A | * | 1/2025 | H04W 52/02 |
| CN | 119678576 A | * | 3/2025 | H04W 52/0235 |
| EP | 4160246 A2 | * | 4/2023 | G01S 5/017 |
| EP | 4322624 A1 | * | 2/2024 | H04W 72/0453 |
| EP | 4412137 A1 | * | 8/2024 | H04L 5/0053 |
| WO | WO-2019034035 A1 | * | 2/2019 | B60R 25/104 |
| WO | WO-2021237393 A1 | * | 12/2021 | |
| WO | WO-2021238887 A1 | * | 12/2021 | G01S 13/003 |
| WO | WO-2021243597 A1 | * | 12/2021 | |
| WO | WO-2022200673 A1 | * | 9/2022 | G01S 13/765 |
| WO | WO-2024015894 A1 | * | 1/2024 | |
| WO | WO-2024045082 A1 | * | 3/2024 | H04W 36/0058 |

* cited by examiner

WAKE-UP SIGNAL FOR NON-DATA SERVICES

TECHNICAL FIELD

The present disclosure relates generally to communication systems, and more particularly, to a wireless communication involving a wake-up signal (WUS).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus monitors for a low-power (LP)-wake-up signal (WUS) (LP-WUS) during one or more LP-WUS monitoring occasions, where at least one of the LP-WUS or the one or more LP-WUS monitoring occasions is associated with at least one non-data service. The apparatus performs the at least one non-data service in response to detecting the LP-WUS during the one or more LP-WUS monitoring occasions.

In an aspect of the disclosure, a method, a computer-readable medium, and an apparatus are provided. The apparatus transmits, for a user equipment (UE), an indication to monitor for an LP-WUS during one or more LP-WUS monitoring occasions, where at least one of the LP-WUS or the one or more LP-WUS monitoring occasions is associated with at least one non-data service. The apparatus transmits, for the UE, the LP-WUS during the one or more LP-WUS monitoring occasions to request the UE to perform the at least one non-data service.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
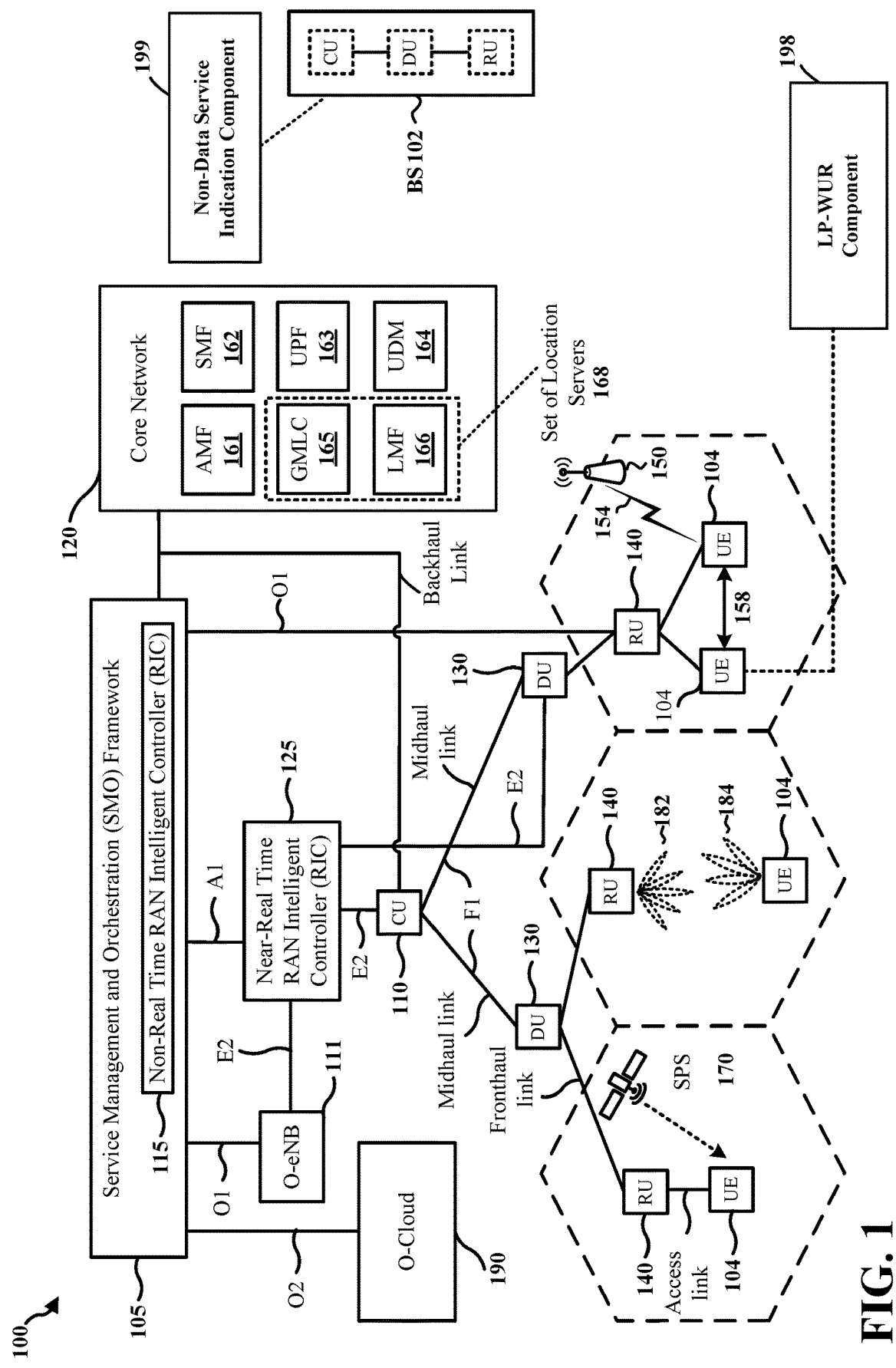
FIG. 1 is a diagram illustrating an example of a wireless communications system and an access network.

Aspects presented herein may enable a low-power wake-up signal (LP-WUS) to be associated with one or more non-data operations/services, which may include radio frequency (RF) sensing, positioning, and/or radio frequency identification (RFID) processing, etc. Thus, if a user equipment (UE) is configured to use a low-power wake-up radio (LP-WUR) during a radio resource control (RRC) connected mode or an RRC idle mode (e.g., for this the UE may be in a sleep mode), the UE may be triggered/configured to provide one or more non-data operations/services in response to receiving an LP-WUS via the LP-WUR. Aspects presented herein may improve the efficiency, latency, and power consumption of a UE performing non-data operations/service(s) as the UE may be triggered to perform the non-data operations/service(s) based on monitoring the LP-WUS using the WUR.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RA configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to monitor for an LP-WUS during one or more LP-WUS monitoring occasions, where at least one of the LP-WUS or the one or more LP-WUS monitoring occasions is associated with at least one non-data service; and perform the at least one non-data service in response to detecting the LP-WUS during the one or more LP-WUS monitoring occasions (e.g., via the LP-WUR component 198).

In certain aspects, the base station 102 may be configured to transmit, for a UE, an indication to monitor for an LP-WUS during one or more LP-WUS monitoring occasions, where at least one of the LP-WUS or the one or more LP-WUS monitoring occasions is associated with at least one non-data service; and transmit, for the UE, the LP-WUS during the one or more LP-WUS monitoring occasions to request the UE to perform the at least one non-data service (e.g., via the non-data service indication component 199).

Figure 2:
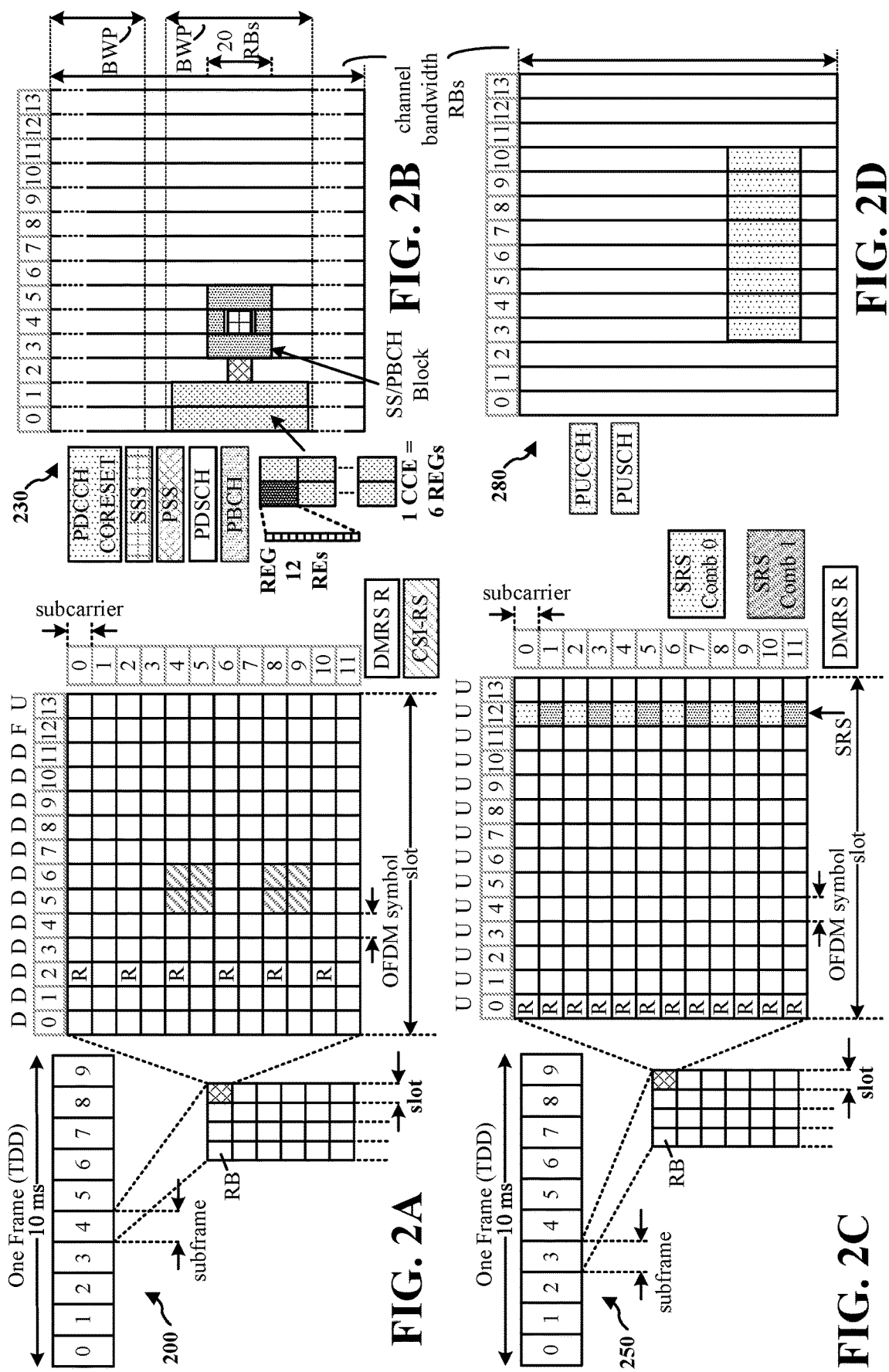
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| µ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies µ 0 to 4 allow for 1, 2, 4, 8, and 16 slots, respectively, per subframe. For extended CP, the numerology 2 allows for 4 slots per subframe. Accordingly, for normal CP and numerology p, there are 14 symbols/slot and $2^\mu$ slots/subframe. The subcarrier spacing may be equal to $2^\mu*15$ kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of normal CP with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
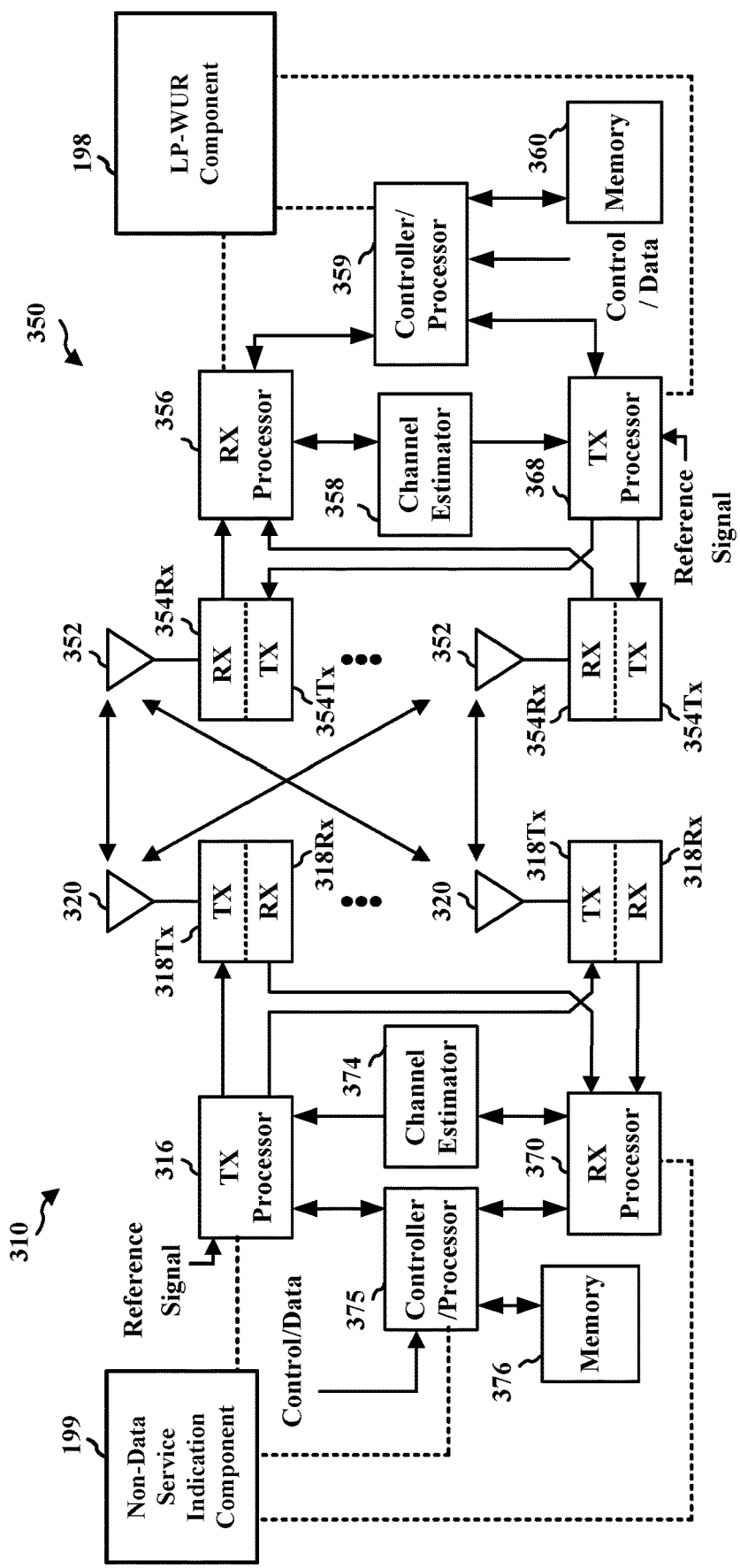
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the LP-WUR component 198 of FIG. 1.

At least one of the TX processor 316, the RX processor 370, and the controller/processor 375 may be configured to perform aspects in connection with the non-data service indication component 199 of FIG. 1.

Figure 4:
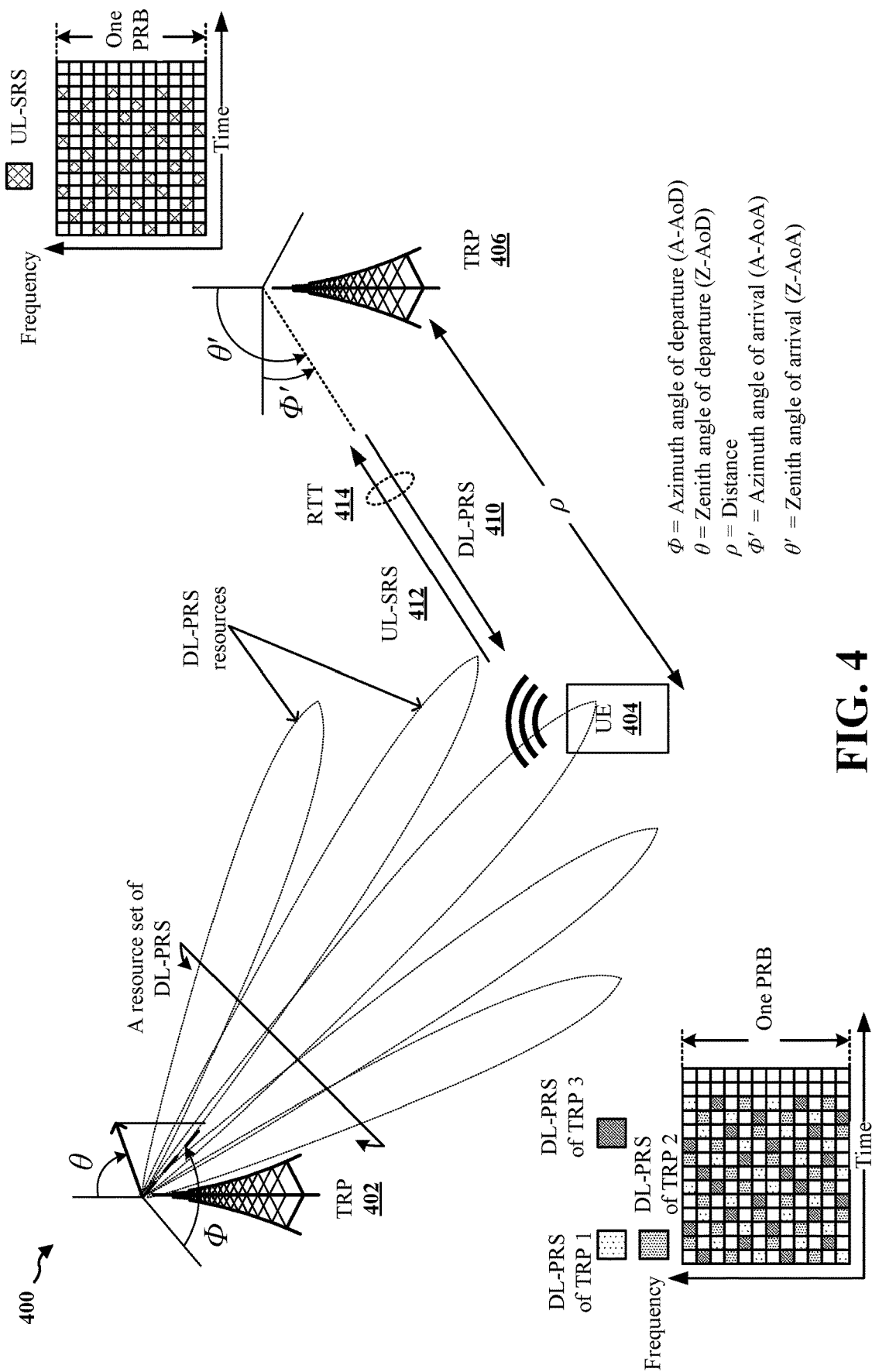
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL SRS 412 at time $T_{SRS\_TX}$ and receive DL positioning reference signals (PRS) (DL PRS) 410 at time $T_{PRS\_RX}$. The TRP 406 may receive the UL SRS 412 at time $T_{SRS\_RX}$ and transmit the DL PRS 410 at time $T_{PRS\_TX}$. The UE 404 may receive the DL PRS 410 before transmitting the UL SRS 412, or may transmit the UL SRS 412 before receiving the DL PRS 410. In both cases, a positioning server (e.g., location server(s) 168) or the UE 404 may determine the RTT 414 based on $||T_{SRS\_RX}-T_{PRS\_TX}|-|T_{SRS\_TX}-T_{PRS\_RX}||$. Accordingly, multi-RTT positioning may make use of the UE Rx-Tx time difference measurements (i.e., $|T_{SRS\_TX}-T_{PRS\_RX}|$) and DL PRS reference signal received power (RSRP) (DL PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL SRS-RSRP at multiple TRPs 402, 406 of uplink signals transmitted from UE 404. The UE 404 measures the UE Rx-Tx time difference measurements (and/or DL PRS-RSRP of the received signals) using assistance data received from the positioning server, and the TRPs 402, 406 measure the gNB Rx-Tx time difference measurements (and/or UL SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL PRS-RSRP of downlink signals received from multiple TRPs 402, 406 at the UE 404. The UE 404 measures the DL PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL PRS-RSRP) of downlink signals received from multiple TRPs 402, 406 at the UE 404. The UE 404 measures the DL RSTD (and/or DL PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL SRS-RSRP) at multiple TRPs 402, 406 of uplink signals transmitted from UE 404. The TRPs 402, 406 measure the UL-RTOA (and/or UL SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

To minimize latency and/or to reduce signaling load, if there is no activity from a UE for a defined duration, the UE may be configured to suspend its communication session (e.g., with a network entity such as a base station) by transitioning to a radio resource control (RRC) inactive state. For example, after a random-access procedure, a UE may be in an RRC connected state. The RRC protocol may be used on an air interface between a UE and a base station. The major functions of the RRC protocol may include connection establishment and release functions, broadcast of system information, radio bearer establishment, reconfiguration, and release, RRC connection mobility procedures, paging notification and release, and/or outer loop power control, etc. In some examples, such as in LTE, a UE may be in one of two RRC states (e.g., a connected state or an idle state). In other examples, such as in NR, a UE may be in one of three RRC states (e.g., a connected state, an idle state, or an inactive state). The different RRC states may have different radio resources associated with each state that a UE may use when the UE is in a given state. In some examples, the RRC states may also be referred to as RRC modes.

Figure 5:
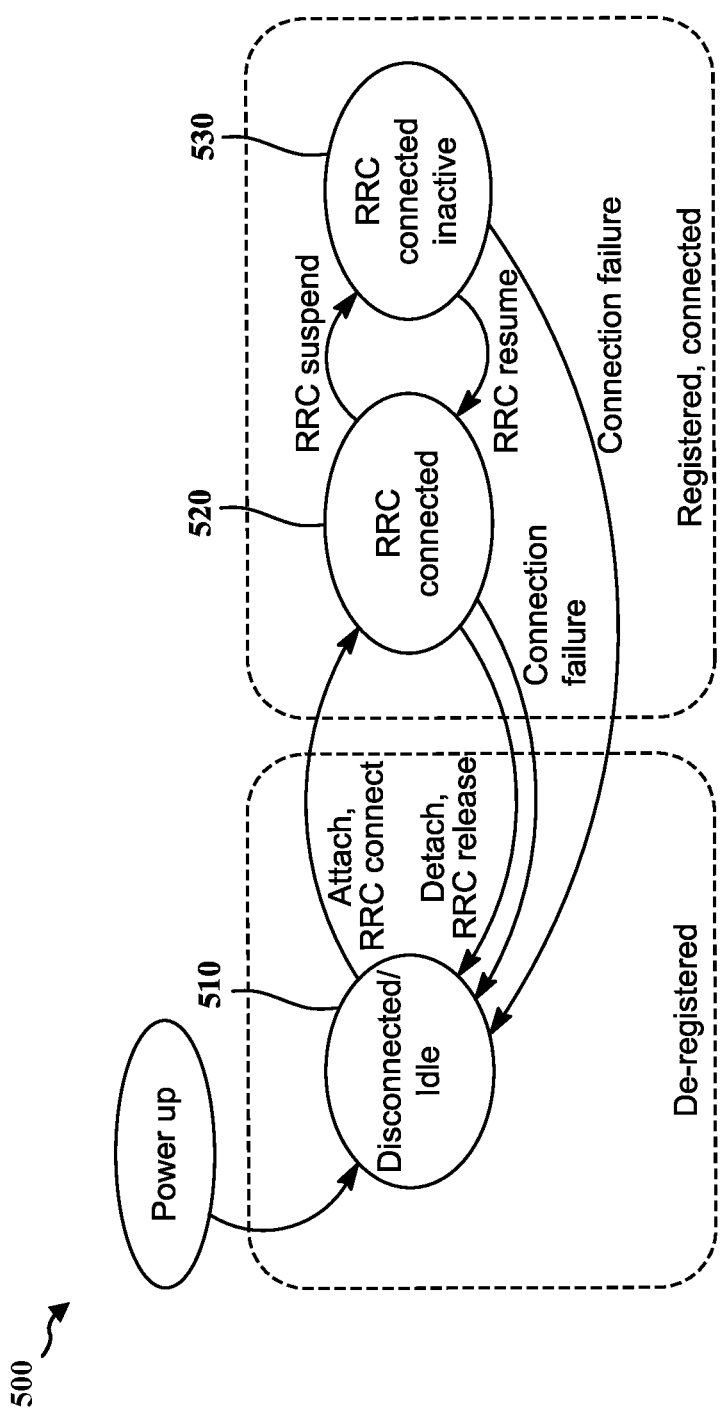
FIG. 5 is a diagram illustrating an example of different radio resource control (RRC) states in accordance with various aspects of the present disclosure.

FIG. 5 is a diagram 500 illustrating an example of different RRC states in accordance with various aspects of the present disclosure. When a UE is powered up, the UE may initially be in an RRC disconnected/idle state 510. After a random access procedure, the UE may transition (or move) to an RRC connected state 520. If there is no activity at the UE for a defined duration, the UE may suspend its communication session (e.g., with a base station) by transitioning to an RRC inactive state 530. The UE may resume its communication session by performing a random access procedure to transition back to the RRC connected state 520. Thus, the UE may be specified to perform a random access procedure to transition to the RRC connected state 520, regardless of whether the UE is in the RRC idle state 510 (or simply an idle state or an idle mode) or the RRC inactive state 530 (or simply an inactive state or an inactive mode). As such, the RRC inactive state 530 may be a state between the RRC connected state 520 and the RRC disconnected/idle state 510 where the UE may stay in an inactive state without completely releasing the RRC when there is no traffic and quickly switch back to connected states when necessary.

In some examples, the RRC idle state 510 may be used for public land mobile network (PLMN) selection, broadcast of system information, cell re-selection mobility, paging for mobile terminated data (initiated and managed by the 5GC), and/or discontinuous reception (DRX) for core network paging (configured by non-access stratum (NAS)), etc. In other examples, the RRC connected state 520 may be used for 5GC and new RAN connection establishment (both control and user planes), UE context storage at the new RAN and the UE, new RAN knowledge of the cell to which the UE belongs, transfer of unicast data to/from the UE, and/or network-controlled mobility, etc. In other examples, the RRC inactive state 530 may be used for the PLMN selection, broadcast of system information, cell re-selection for mobility, paging (initiated by the new RAN), RAN-based notification area (RNA) management (by the new RAN), DRX for RAN paging (configured by the new RAN), 5GC and new RAN connection establishment for the UE (both control and user planes), storage of the UE context in the new RAN and the UE, and/or new RAN knowledge of the RNA to which the UE belongs, etc.

In some scenarios, during a UE positioning session, a UE (e.g., the UE 404) may also transition into the RRC inactive state to conserve radio and/or power resources while continuing to participate in the UE positioning session. For example, during a UE-assisted positioning session, a UE may transition into an RRC inactive state while continuing to measure DL PRS transmitted from a base station and report the DL PRS measurements to the base station or a location server. In one example, the UE may report the DL PRS measurements based on small data transmission (SDT) (or UL SDT). The SDT may refer to a transmission for a short data burst in a connectionless state where a UE is not specified to establish connections when small amounts of data or data below a size threshold is to be sent by the UE. In other words, SDT may enable a UE in an RRC inactive state to transmit infrequent and small data without specifying an RRC state transition.

For example, in some wireless communication networks, uplink (UL) data generated in an RRC idle state of a UE may be transmitted by the UE after the UE transitions to an RRC connected state. The UE may transition from the RRC idle state to the RRC connected state transmitting an RRC resume request message to the serving base station. After transmission of the UL data, a UE in the RRC connected state may be specified to receive an RRC release message from a base station for transitioning back to the RRC idle state. This UL transmission mechanism may not be suitable for UL data below certain size(s) (e.g., which may be referred to as small data or SDT) as the overheads of the overall procedure are inefficient to transmit small amount of data (e.g., the size of the overheads may be larger than the data and/or the time it takes to transition the UE to RRC connected state may be longer than the actual data transmission, etc.). To improve the resource utilization, some wireless communication networks may include mechanisms for transmitting SDT without specifying the UE to transition to an RRC connected stated. For example, a wireless communication network may support early data transmission (EDT) and transmission using pre-configured uplink resource (PUR). The EDT may enable a UE device to receive UL grant for SDT in an RRC idle/inactive state via a random access procedure for the EDT. The UE in the RRC idle/inactive state may transmit UL small data using the uplink grant. The transmission using PUR allows SDT from an RRC idle/inactive state using PUR without performing a random access procedure. For purposes of the present disclosure, an UL SDT message may refer to a message with a size that qualifies as an SDT (e.g., the size is below certain threshold) and may be transmitted by a UE based on the EDT mechanism.

Similarly, during a network-based positioning session, a UE may also be configured to transmit UL SRS while in an RRC inactive state. For example, an assistance data with SRS configuration may be provided to the UE while the UE is in the RRC connected state, and the UE may continue to transmit SRS based on the SRS configuration after transition to the RRC inactive state. In other words, the assistance data is provided when the UE is in RRC connected state and carries over to the RRC inactive state.

As described in connection with FIG. 5, when a UE enters into an RRC idle/inactive state/mode, the UE may reduce power consumption by performing a DRX operation in which the UE monitors for communication or transmits communication during a DRX ON duration and does not monitor for communication or transmit communication during a DRX OFF duration. For example, the UE may monitor for transmission (e.g., from a network entity such as a base station) discontinuously using a sleep and wake cycle. The DRX OFF duration may correspond to a time during which the UE operates in a lower power mode, a sleep mode, etc. During the DRX OFF duration, the UE may shut down, turn off, or not use a radio frequency (RF) function. The DRX pattern may include one or more timers or values, such as an DRX ON duration timer or a value that indicates the starting point of the DRX ON duration and/or the DRX OFF duration, etc. The DRX ON duration timer may indicate a period of time, e.g., in consecutive symbols, slots, subframes, or TTIs, in which the UE wakes up from the DRX OFF duration and monitors for control signaling. A DRX cycle may include a periodic repetition of the DRX ON duration and the DRX OFF duration. By having periods during which the UE does not monitor for or transmit communication, the UE may save power or extend battery life for the UE. For example, DRX may provide power savings, e.g., at a physical layer or a medium access control (MAC) layer.

A base station may configure a UE with a DRX configuration. For example, the base station may configure DRX parameters for the UE that indicate the DRX cycle, the DRX ON duration, etc. Additionally, the base station may schedule communications for the UE based on the UE's DRX configuration as the base station is aware of the DRX configuration provided to the UE.

Figure 6:
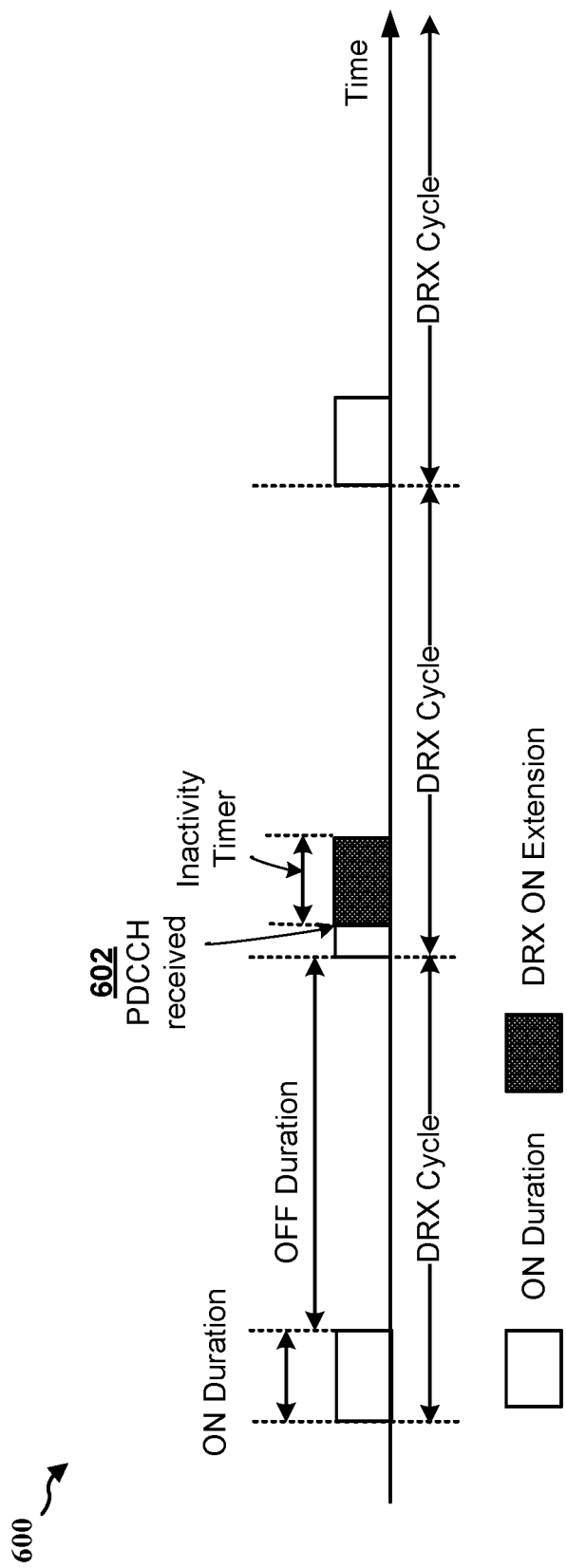
FIG. 6 is a diagram illustrating an example of a discontinuous reception (DRX) cycle that may be configured by a base station for a UE in accordance with various aspects of the present disclosure.

FIG. 6 is a diagram 600 illustrating an example of a DRX cycle that may be configured by a base station for a UE in accordance with various aspects of the present disclosure. A UE may monitor for a PDCCH from a base station during a DRX ON duration and may skip monitoring for a PDCCH during a DRX OFF duration. If the UE receives a PDCCH during the on duration, such as illustrated at 602, the UE may stay awake for an extended period of time based on an inactivity timer that starts upon reception of the PDCCH. If the UE does not receive downlink communication from the base station during the duration of the inactivity timer, the UE may stop monitoring, e.g., enter a sleep mode or lower power mode, for the remaining DRX OFF duration.

In some network configurations, a network entity (e.g., a base station) may transmit a paging signal, which may also be referred to as a wake-up signal (WUS), to a UE in an idle/inactive state to wake up the UE from the idle/inactive state, such that the UE may prepare receiving/transmitting data. In some examples, as a WUS may be received via a PDCCH, the WUS may also be referred to as a PDCCH-WUS.

Figure 7:
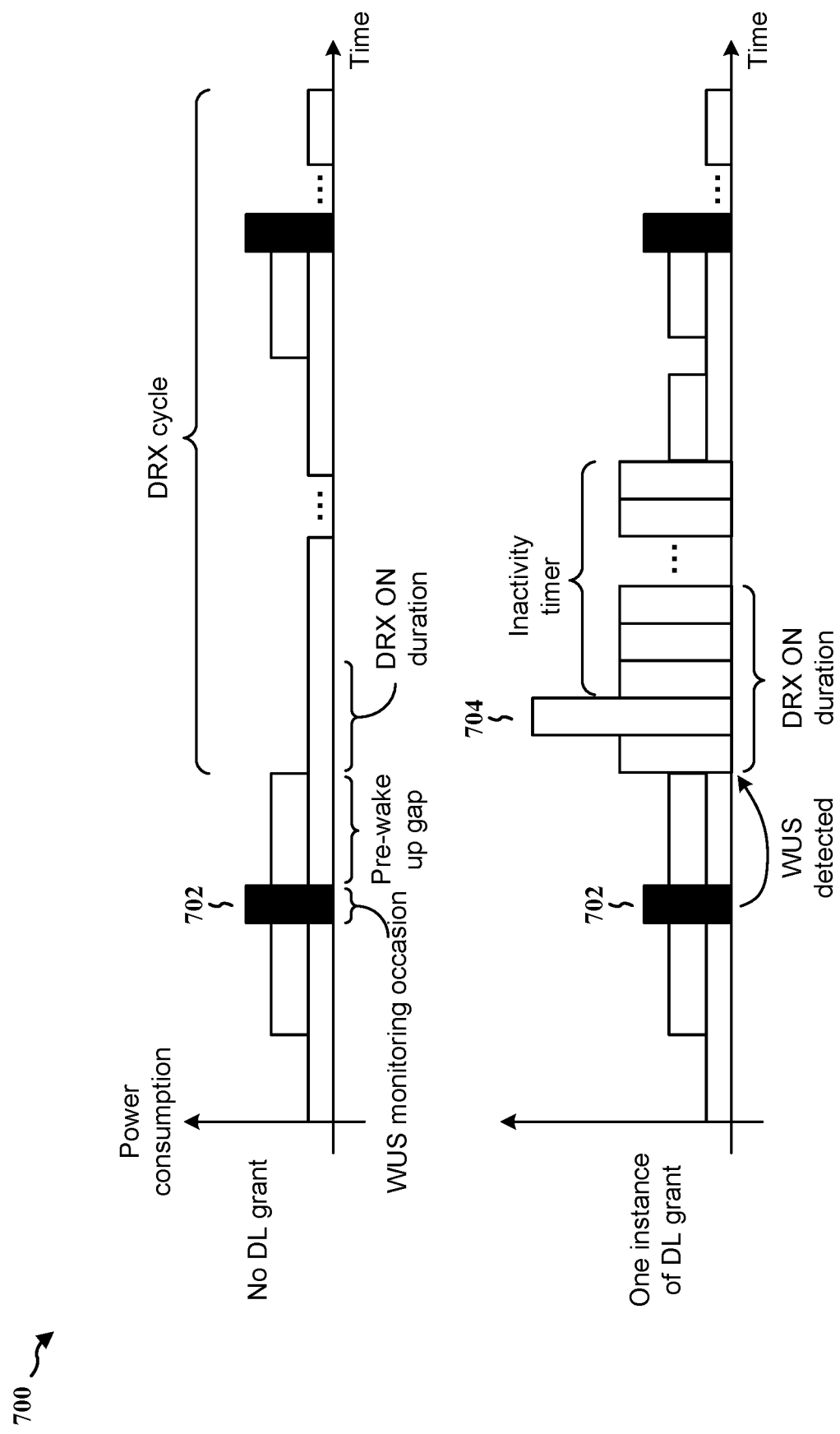
FIG. 7 is a diagram illustrating an example of a wake-up signal (WUS) monitoring occasion at a UE in accordance with various aspects of the present disclosure.

FIG. 7 is a diagram 700 illustrating an example of a WUS monitoring occasion at a UE in accordance with various aspects of the present disclosure. As shown at 702, a WUS may be a PDCCH (e.g., a special/specific type of PDCCH) sent by a network entity (e.g., a base station) to a UE before a DRX ON duration (e.g., DRX ON duration 704) of the UE, where the WUS may indicate whether the UE may skip monitoring the next DRX ON duration. In other words, a UE may be configured with a two-stage wake-up, where the first stage is for PDCCH-WUS detection and the second stage is for monitoring scheduling and reception of new data, such as shown at 804. This two-stage wake-up configuration may facilitate a low power implementation for PDCCH-WUS detection, because during the first stage of wake-up, one or more of following optimizations may become feasible: (1) configuring a minimal set of hardware that is to be brought online for PDCCH processing; (2) configuring the operating point in terms of the voltage levels and clock frequencies of the hardware; (3) providing a more relaxed PDCCH processing timeline due to the WUS offset (e.g., offline processing); and/or potentially reducing the reception (Rx) bandwidth, a number of candidates/aggregation levels for PDCCH-WUS, etc.

Figure 8:
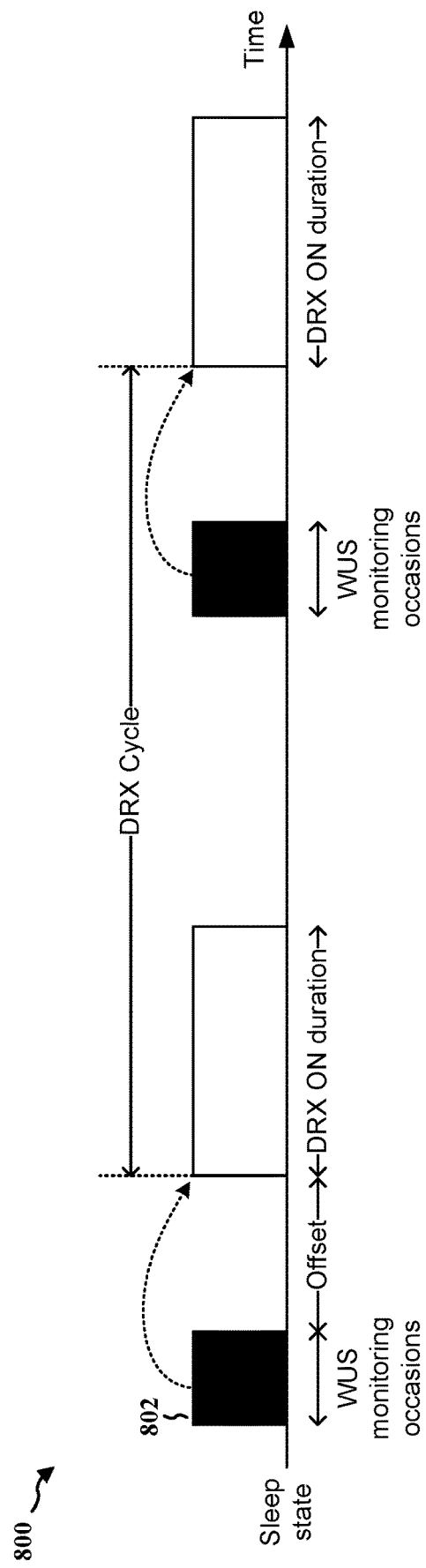
FIG. 8 is a diagram illustrating an example of configuring a UE to monitor for a WUS outside a DRX active time in accordance with various aspects of the present disclosure.

FIG. 8 is a diagram 800 illustrating an example of configuring a UE to monitor for a WUS outside a DRX active time in accordance with various aspects of the present disclosure. As shown at 802, a UE configured with a DRX mode operation (e.g., as described in connection with FIGS. 7 and 8) may also be configured to monitor a WUS outside a DRX active time. For example, a set of WUS monitoring occasions may be associated with each DRX cycle. A WUS may indicate whether the UE's MAC entity is to start a DRX ON duration timer (e.g., drx-onDurationTimer) for a next DRX cycle. In addition, the WUS may not impact other timers, such as the BWP inactivity timer (e.g., bwp-inactivityTimer), the data inactivity timer (e.g., dataInactivityTimer), and/or the SCell deactivation timer (e.g., sCellDeactivationTimer), etc.

In some examples, a WUS may be a PDCCH defined by a DCI format 2_6 with cyclic redundancy checks (CRC) scrambled by a power saving-radio network temporary identifier (PS-RNTI). A WUS may be shared by a group of UEs and may be monitored in common search space sets. In other examples, a WUS may be configured just on a PCell or a PSCell, and the WUS may indicate a dormancy behavior for (up to 5) SCell groups.

Figure 9:
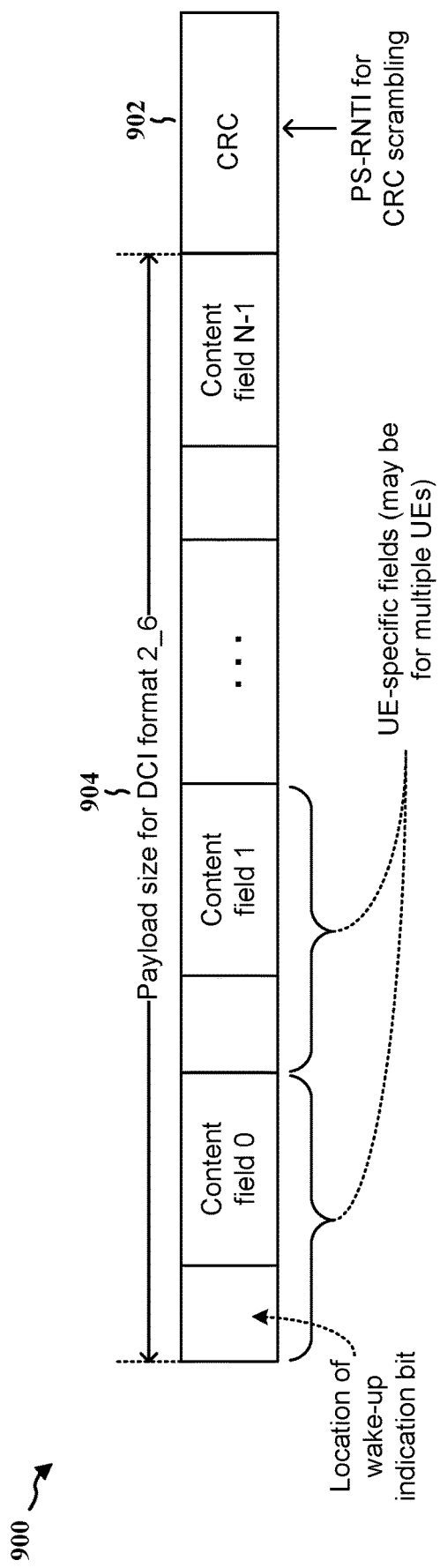
FIG. 9 is a diagram illustrating an example configuration for a WUS based on a downlink control information (DCI) format 2_6 in accordance with various aspects of the present disclosure.

FIG. 9 is a diagram 900 illustrating an example configuration for a WUS based on a DCI format 2_6 in accordance with various aspects of the present disclosure. As shown at 902, a WUS based on a DCI format 2_6 may include a PS-RNTI for scrambling CRC of the DCI format 2_6, where a UE may be configured with a Type3-PDCCH common search space (CSS) set(s) for monitoring the DCI format 2_6 with the PS-RNTI. IN some examples, more than one search space set may be configured for DCI format 2_6, and associated control resource sets (CORESETs) with the search space sets may have different TCI states (e.g., for WUS beam sweeping in frequency range 2 (FR2)).

As shown at 904, the payload of a WUS may include multiple UE-specific fields (e.g., for multiple UEs), and each UE-specific field may include a wake-up indication bit for indicating the position of the corresponding UE-specific field. For example, the DCI format 2_6 (or the PDCCH-WUS) may be shared by a group of UEs, where each UE in the group may be assigned with a UE-specific field in the DCI format 2_6. In some examples, SCell groups (e.g., up to 5) for dormancy behavior indication may be configured outside of a DRX active time, and SCell groups for dormancy behavior indication during the DRX active time may be configured separately (e.g., by scheduling DCI). In addition, a time offset parameter (e.g., ps_Offset) may be used for indicating a time that a UE starts locating monitoring occasions for DCI format 26 prior to a slot where a DRX cycle start, where the time offset may be 0.125 milliseconds (ms), 0.25 ms, 0.375 ms, . . . , 15 ms, etc. (e.g., ps_Offset∈{0.125 ms, 0.25 ms, 0.375 ms, . . . , 15 ms}).

Figure 10:
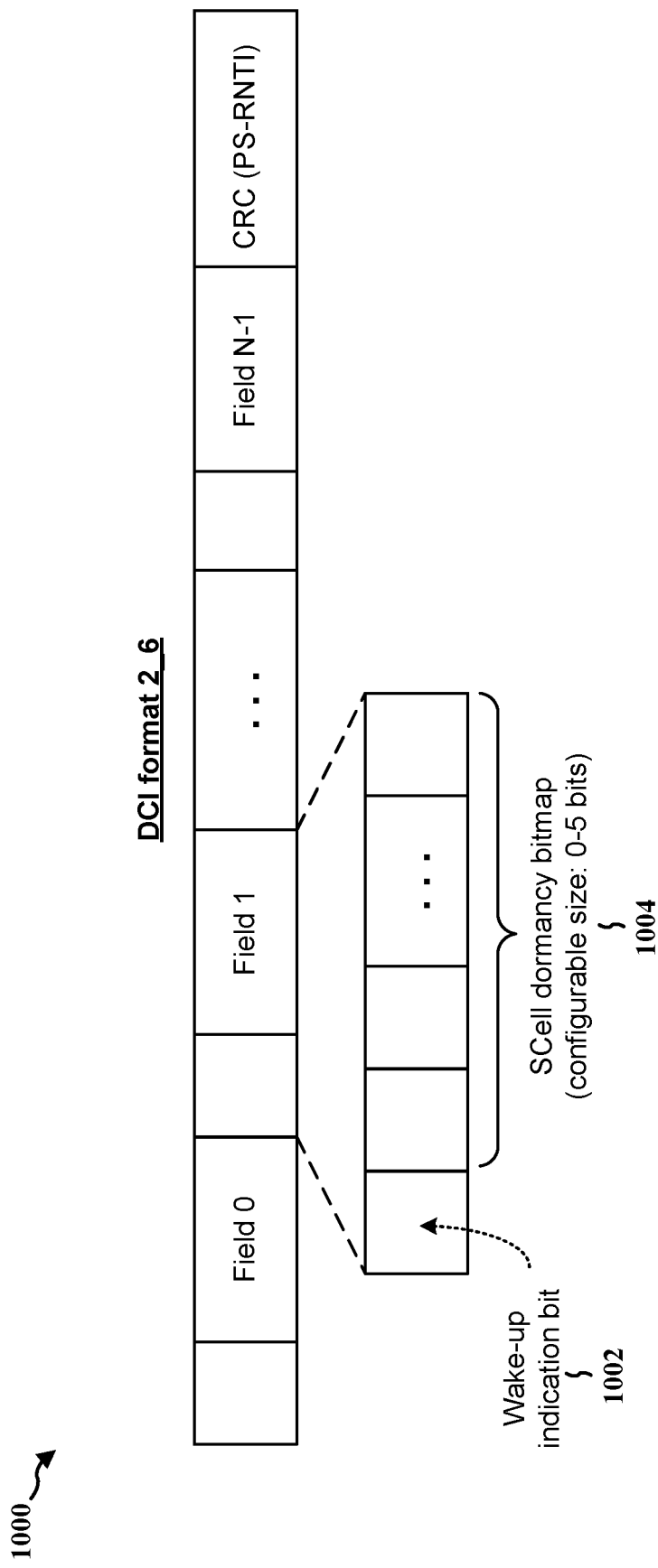
FIG. 10 is a diagram illustrating an example composition and functionality of a DCI format 2_6 in accordance with various aspects of the present disclosure.

FIG. 10 is a diagram 1000 illustrating an example composition and functionality of a DCI format 2_6 in accordance with various aspects of the present disclosure. After a DCI format 2_6 is detected on a WUS monitor occasion (MO) by a UE, the UE may find an assigned field within the DCI. For example, as shown at 1002 and 1004, each UE-specific field may include a wake-up indication bit and a bitmap for SCell dormancy indication (e.g., with a configurable size between 0-5 bits), which may be used for indicating different UE behaviors. Table 2 below provides an example of different UE behaviors for different wake-up indications and different bitmaps for SCell dormancy indication.

TABLE 2

Example UE Behaviors

| | Indicated UE behavior | |
|---|---|---|
| | Bit '0' | Bit '1' |
| Wake-up indication bit | Do not start drx-onDurationTimer for the next DRX cycle | Start drx-onDurationTimer for the next DRX cycle |
| Bitmap for SCell dormancy indication | For each activated SCell in the corresponding SCell group:<br>If the current active BWP is a non-dormant BWP, it switches to the dormant-BWP<br>If the current active BWP is the dormant BWP, it continues with the dormant BWP | For each activate SCell in the corresponding SCell group:<br>If the current active BWP is a non-dormant BWP, it continues with the same BWP<br>If the current active BWP is the dormant BWP, it switches to a specific non-dormant BWP configured by RRC |

Figure 11:
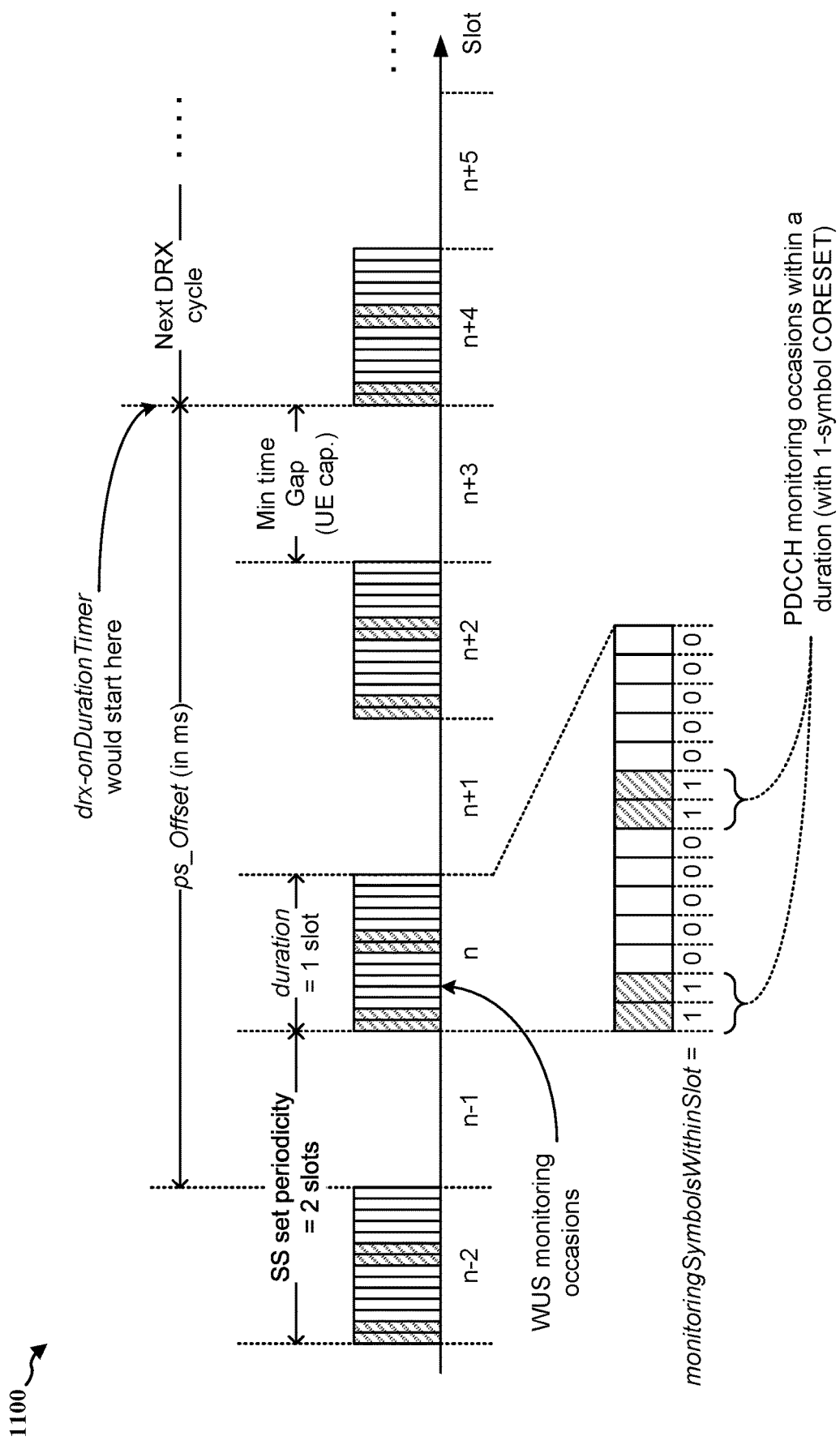
FIG. 11 is a diagram illustrating an example UE behavior for monitoring WUS in accordance with various aspects of the present disclosure.

FIG. 11 is a diagram 1100 illustrating an example UE behaviour for monitoring WUS in accordance with various aspects of the present disclosure. For each search space set configured for monitoring DCI format 2_6, a UE may monitor PDCCH occasions in the first duration starting at or after ps_Offset and ending before slot that the drx-onDurationTimer would start. A "minimum time gap" may be defined as the time duration before the slot that the drx-onDurationTimer would start, within which the UE may not be specified to monitor DCI format 2_6. The minimum time gap may be based on the UE capability and in unit of slots (e.g., SCS dependent). For each SCS supported by a UE, the UE may report one value from two candidate values (e.g., a maximum of three (3) ms).

In some examples, if a UE detects DCI format 2_6 in at least one monitoring occasion (MO), the UE may follow the indication in the UE-specific field in the DCI (e.g., as discussed in connection with Table 2). If a UE monitors WUS MOs, but no DCI format 2_6 is detected (e.g., a discontinuous transmission (DTX) from a base station or misdetection at UE), then a higher layer parameter ps-WakeupOrNot may indicate whether or not to start drx-onDurationTimer for the next DRX cycle. In one example, if ps-WakeupOrNot is not provided, the UE may not start drx-onDurationTimer for the next DRX cycle.

In some examples, if both short and long DRX cycles are configured, DCI format 2_6 may be monitored just for long DRX cycles. For DRX short cycles, a default DRX operation may be assumed (drx-onDurationTimer is always started for DRX Short cycles). In addition, a UE may not be specified to monitor DCI format 26 during DRX active time. In some examples, the UE may be configured to always start drx-onDurationTimer for the next DRX cycle if (any of the following is true): (1) the current active BWP is not configured to monitor DCI format 2_6; (2) the UE is not specified monitor PDCCH for detection of DCI format 26 (e.g., due to overlap with SSBs, other PDCCH occasions with different QCL-TypeD properties, measurement gap, BWP switching delay, etc.) for all WUS MOs; or (3) there is no WUS monitoring occasions for a DRX cycle.

In some examples, to further reduce power consumption at a UE, the UE may be configured with a low-power (LP)-wake-up radio (WUR) (LP-WUR) (which may also be referred to as simply an WUR in some examples). An LP-WUR may refer to a simple (or less complex) radio receiver circuit (e.g., a non-coherent envelope detector) that is designed to have a very low energy consumption.

Figure 12A:
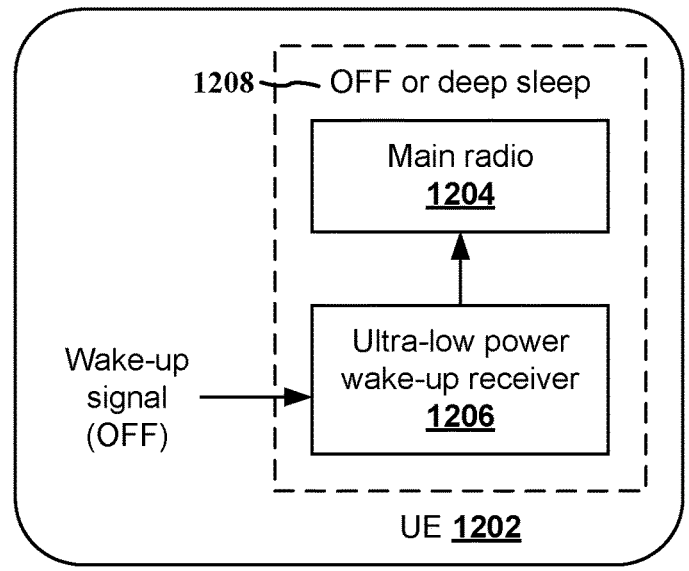
FIG. 12A is a diagram illustrating an example of a low-power wake-up radio (LP-WUR) in accordance with various aspects of the present disclosure.
Figure 12B:
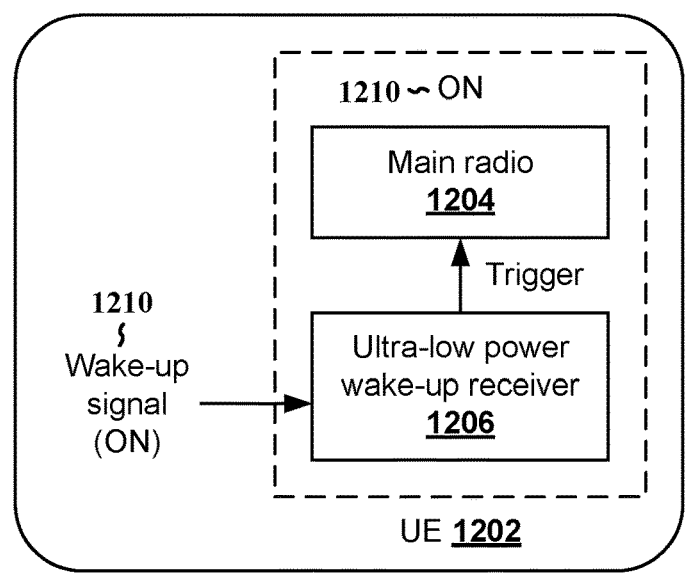
FIG. 12B is a diagram illustrating an example of a low-power wake-up radio (LP-WUR) in accordance with various aspects of the present disclosure.

FIGS. 12A and 12B are diagrams 1200A and 1200B illustrating an example of an LP-WUR in accordance with various aspects of the present disclosure. As shown at 1202 of the diagram 1200A, when there is no data to be received by a UE 1202, a main radio 1204 of the UE 1202 may be turned off or transition into a deep sleep mode (e.g., deep sleep mode 1208) unless there is something to transmit. At the same time, an LP-WUR 1206 of the UE 1202 may keep active monitoring for a low-power WUS (LP-WUS) (which may also be referred to as simply an WUS in some examples).

As shown at 1210 of the diagram 1200B, when there is data to be received by the UE 1202, the LP-WUR 1206 may receive an on-demand LP-WUS (e.g., from a network entity). In response to the LP-WUS, the UE 1202 may activate its main radio 1204 and data may be transmitted and received by the UE 1202 using the main radio 1204.

A UE with an LP-WUR may not suffer from the latency and the efficiency trade-off as UEs without the LP-WUR. For example, a UE without an LP-WUR may be specified to activate and use its main radio during WUS monitoring occasions, where the WUS monitoring occasions may be configured with a defined periodicity, such as described in connection with FIGS. 8 and 11. On the other hand, for a UE with an LP-WUR, the UE may not be specified to activate its main radio while the LP-WUR is monitoring for WUS, and the UE may receive a WUS at any time (e.g., based on a demand/request from a network entity). Such a configuration may enable frequent WUS monitoring to meet latency conditions. In addition, LP-WUR may present lower energy consumption than some of duty-cycling schemes, such as avoiding unnecessary main radio wakeup for PDCCH monitoring.

Figure 13:
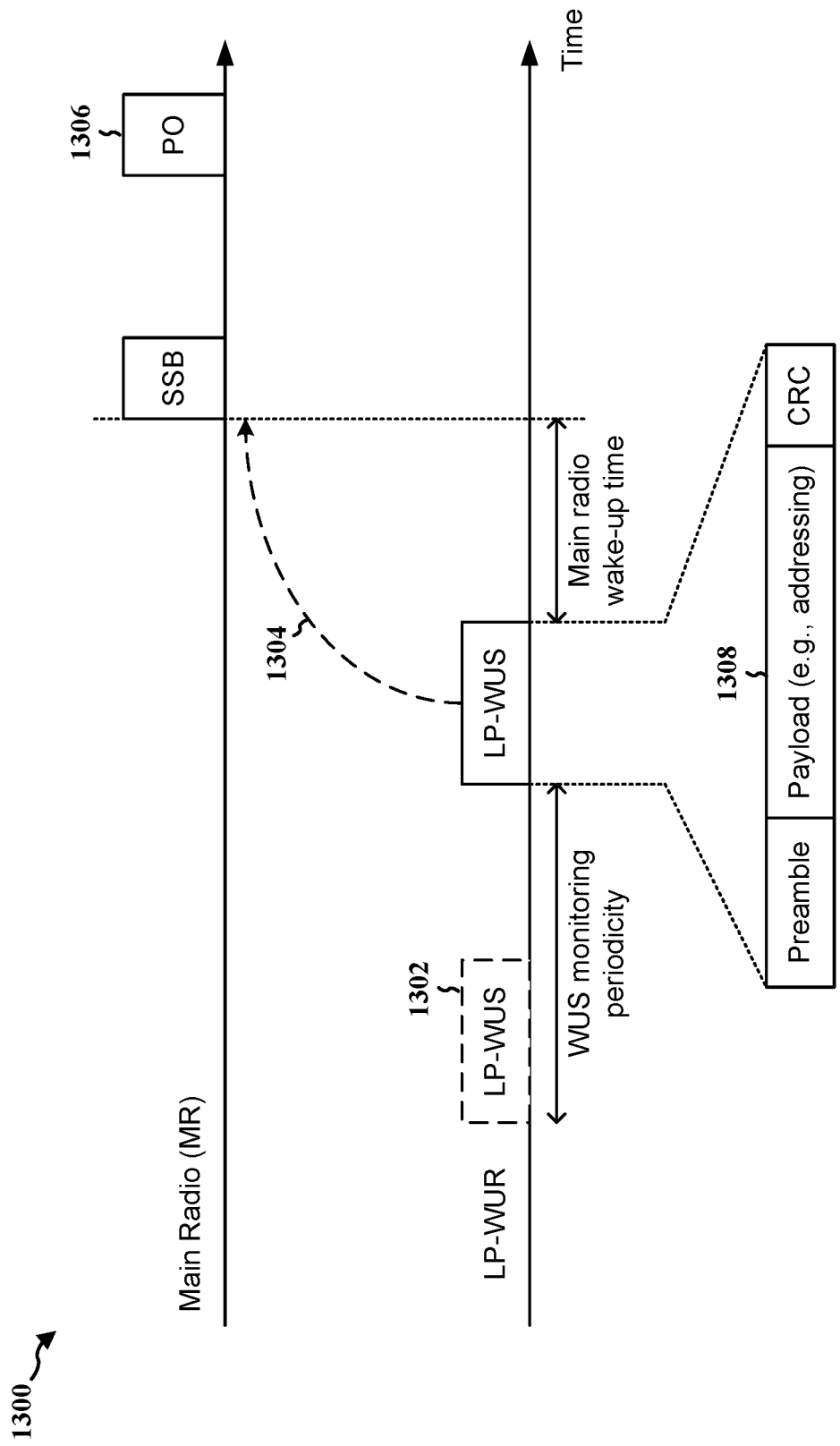
FIG. 13 is a diagram illustrating an example LP-WUR for paging monitoring in accordance with various aspects of the present disclosure.

FIG. 13 is a diagram 1300 illustrating an example LP-WUR for paging monitoring in accordance with various aspects of the present disclosure. In another example, one application for the LP-WUR configuration may include reducing the amount of (e.g., unnecessary) UE paging receptions. For example, as shown at 1302, an LP-WUS may be transmitted to a UE (e.g., the UE 1202) in an idle mode or inactive mode when there is a paging for the UE. Then, as shown at 1304, if the UE detects an LP-WUS, the main radio of the UE is turned on to monitor for synchronization signal block (SSB) before a paging occasion (PO) for synchronization. Then, the UE may receive the paging accordingly, such as shown at 1306. On the other hand, if an LP-WUS is not detected, the main radio of the UE may stay in a deep sleep mode for power saving. In some examples, as shown at 1308, an LP-WUS may carry more than 1-bit payload (e.g., addressing information). In addition, a WUR preamble may be inserted before the payload and used for the WUR detection, automatic gain control (AGC), and/or symbol timing recovery. In some examples, cyclic redundancy check (CRC) bits may also be appended for payload protection.

In addition to network-based UE positioning technologies, a wireless device (e.g., a base station, a component of the base station, a UE, etc.) may also be configured to include radar capabilities, which may be referred to as "radio frequency (RF) sensing" and/or "cellular-based RF sensing." For example, a wireless device may transmit radar reference signals (RRSs) and measure the RRSs reflected from one or more objects. Based at least in part on the measurement, the wireless device may determine or estimate a distance between the wireless device and the one or more objects. In another example, a first wireless device may also receive RRSs transmitted from a second wireless device, where the first wireless device may determine or estimate a distance between the first wireless device and the second wireless device based at least in part on the received RRS. As such, in some examples, RF sensing techniques may be used for UE positioning and/or for assisting UE positioning. For purposes of the present disclosure, a device that is capable of performing RF sensing (e.g., transmitting and/or receiving RRS for detecting an object or for estimating the distance between the device and the object) may be referred to as an "RF sensing node." For example, an RF sensing node may be a UE, a base station, a component of the base station, a TRP, a device capable of transmitting RRS, and/or a device configured to perform radar functions, etc.

In the context of RF sensing, a sensing session may involve a subset of transmission and reception points (TRPs), and/or UEs. In some configurations, it may be up to the sensing entity (e.g., an RF sensing node) to determine which nodes may participate in the RF sensing based on UE/TRP capabilities, UE/TRP locations, and/or the location of the target. The sensing entity may be a dedicated network or a base station. Thus, a UE may be triggered to participate in a sensing session depending on its location, and/or the target location. As a target is moving, some UEs may be specified to participate in the sensing session while others may not be specified to participate in the sensing session (e.g., some UEs may become out of coverage of the target reflections). As such, the network (e.g., the sensing entity) may optimize a sensing session, UEs energy savings, and/or overall over-the-air (OTA) RF transmissions by having the capability to dynamically adjust the set of UEs that participate in the sensing session.

In addition to the RF sensing, as described in connection with FIG. 4, a UE may also participate in other services such as positioning, radio frequency identification (RFID) processing, etc. In some examples, an Internet-of-Things (IoT) device may be referred to as an RFID, an RFID tag (or simply a tag), an RFID device, a passive RFID, a backscatter-based RFID, or a backscatter-based IoT, etc. (collectively as an "RFID tag" hereafter). RFID may refer to a form of wireless communication that incorporates the use of electromagnetic or electrostatic coupling in the radio frequency portion of the electromagnetic spectrum to uniquely identify an object, an animal, or a person, etc. A device that is capable of reading information transmitted from an IoT device may be referred to as a backscatter receiver, a backscatter reader, an RFID reader, an RFID reader UE, and/or a reader UE, etc. (collectively as an "RFID reader" hereafter). In addition, the wireless device that transmits signals to the IoT devices (which may be a different entity than the RFID reader) may be referred to as an RF source, an RF source UE, or a carrier emitter. Note that a wireless device/entity may be capable of both transmitting signals to an IoT device and receiving reflected signals (e.g., readings) from the IoT device, which may be referred to as full-duplex devices. As such, an RF source may also be an RFID reader and vice versa. In some examples, an RFID tag may include small transponder(s) emitting an information-bearing signal upon receiving a signal. An RFID tag may operate without a battery at a low operating expense (OPEX), at a low maintenance cost, and/or with a long-life circle. An RFID tag may absorb/harvest energy over the air based on the energy signals transmitted from an RFID reader or an energy emitting source to power its transmission/reception circuitry. Then, the RFID tag may use the absorbed/harvested energy to transmit (e.g., reflect/backscatter) an information signal (e.g., a signal that contains information, a 1-bit indication, a multi-bit indication, etc.) to the RFID reader (e.g., via a backscattered link (BL)), where the transmitted information signal may be typically backscatter modulated.

Aspects presented herein may enable an LP-WUS to be associated with one or more non-data operations/services, which may include RF sensing, UE positioning, and RFID processing, etc. Thus, if a UE is configured to use a WUR during an RRC connected mode or an RRC idle mode (e.g., for this the UE may be in a very deep sleep mode), the UE may be triggered/configured to provide one or more non-data operations/services in response to receiving an LP-WUS via its WUR. Aspects presented herein may improve the efficiency, latency, and power consumption of a UE performing non-data operations/service(s) as the UE may be triggered to perform the non-data operations/service(s) based on monitoring the LP-WUS using the WUR.

Figure 14:
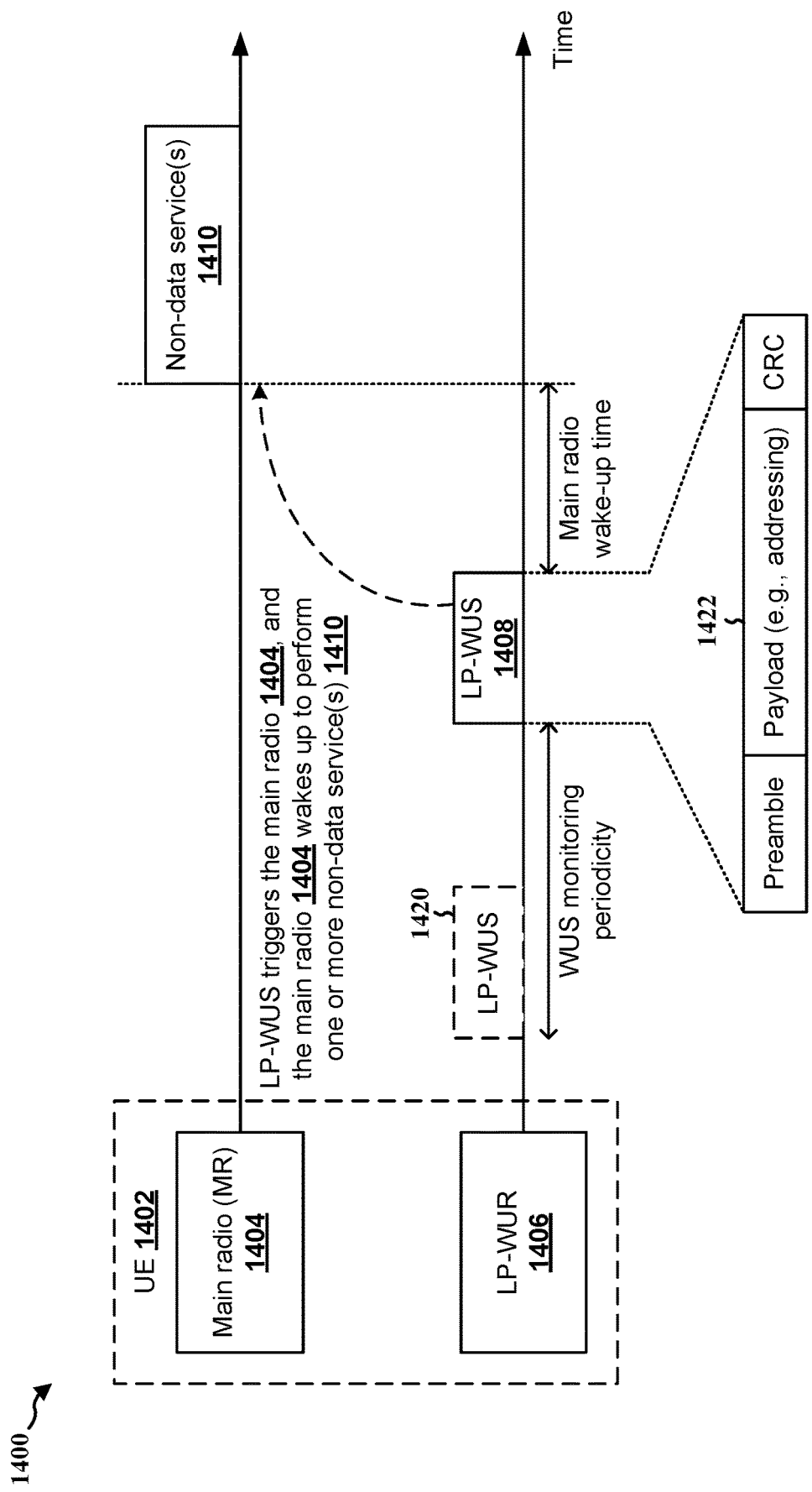
FIG. 14 is a diagram illustrating an example of associating a low-power WUS (LP-WUS) and/or one or more LP-WUS monitoring occasions with at least one non-data service in accordance with various aspects of the present disclosure.

FIG. 14 is a diagram 1400 illustrating an example of associating an LP-WUS and/or one or more LP-WUS monitoring occasions with at least one non-data service in accordance with various aspects of the present disclosure. In one aspect of the present disclosure, a UE 1402 may be configured to monitor for at least one LP-WUS 1408 during one or more LP-WUS monitoring occasions using its LP-WUR 1406, where the LP-WUS, the one or more LP-WUS monitoring occasions, or certain monitoring occasions within the one or more LP-WUS monitoring occasions may be associated with at least one non-data service 1410. Then, if the UE 1402 receives the LP-WUS 1408 during the one or more LP-WUS monitoring occasions or during the certain monitoring occasions within the one or more LP-WUS monitoring occasions, the UE may perform the corresponding non-data service(s) 1410 using its main radio 1404 (e.g., the UE 1402 may first turn on/activate its main radio 1404 if it is in a sleep/inactive mode). An LP-WUS monitoring occasion may refer to a time period or an occasion (e.g., a time instance) in which a UE is configured to monitor/detect/receive at least one LP-WUS. In some examples, an LP-WUS monitoring occasion may correspond to a specific duration of time (e.g., X ms), a periodicity (e.g., every X ms), and/or from a first point of time to a second point of time (e.g., from time Y to time Z).

For purposes of the present disclosure, the non-data service(s) 1410 may refer to services that are not primarily intended for voice/text communication between users and/or for accessing internet. For example, non-data service may include positioning (e.g., UE-based positioning, network-based positioning, etc.), RF sensing (e.g., using reflected radio waves to determine the distance (range), angle, velocity, and/or imaging of target objects), reception/transmission of RF energy (e.g., passive IoT devices that harvest energy from radio signals and use the energy to power communication, energy transfer, etc.), communicating with at least one RFID tag, etc. RF sensing may also include communication-assisted sensing and sensing-assisted communication. Communication-assisted sensing may use RF and/or non-RF sensor inputs to improve existing quality of experience (QoE) for services, and enable new services for use cases such as consumer/gaming, positioning, automotive, etc. Sensing-assisted communication may leverage RF and/or non-RF sensor inputs to improve communication related operations, e.g., to enhance radio resource management (RRM), beam management, mobility, etc.

For example, as shown at 1420, using the LP-WUR 1406, the UE 1402 may be configured to monitor for an LP-WUS 1408 during a set of LP-WUS monitoring occasions that are associated with positioning services (e.g., the non-data service(s) 1410). In some examples, a positioning service may be associated with an LP-WUS. For example, the UE 1402 may be configured to transmit at least one sounding reference signal (SRS) or receive/measure at least one positioning reference signal (PRS) for a positioning session in response to receiving an LP-WUS (e.g., during a common/non-dedicated monitoring occasion). Thus, whenever the UE 1402 receives an LP-WUS (e.g., the LP-WUS 1408), the UE may transmit the at least one SRS or receive/measure the at least one PRS.

In another example, a positioning service may be associated with one or more LP-WUS monitoring occasions. For example, the UE 1402 may be configured to transmit at least one SRS if an LP-WUS is received/detected during a first WUS monitoring occasion (which may be associated with a specified period of time, such as X seconds/milliseconds or from time Y to time Z), and the UE 1402 may be configured to receive/measure at least one PRS (e.g., measure AoA for the at least PRS) if an LP-WUS is received/detected during a second WUS monitoring occasion (which may also be associated with another specified period of time). Thus, if the UE 1402 receives/detects an LP-WUS during the first WUS monitoring occasion, the UE 1402 may transmit at least one SRS, and if the UE 1402 receives/detects an LP-WUS during the second WUS monitoring occasion, the UE 1402 may receive/transmit at least one PRS, etc.

While the example above shows aspects of the present disclosure using UE positioning, it is merely for illustration purposes. Aspects presented herein may also apply to other non-data services and reference signals serving different purposes/services, such as RF sensing, RFID tag processing, energy transfer, etc. For example, the UE 1402 may be configured to monitor certain LP-WUS monitoring occasions for one or more specified non-data services 1410, where each non-data service may be associated with certain LP-WUS monitoring occasion(s). In other words, the UE 1402 may be configured to monitor a set of common monitoring occasions for one or more of non-data services 1410. In some examples, for the positioning, it may include uplink (UL) transmission (e.g., transmitting SRS), downlink (DL) reception (e.g., receiving PRS), or both. Similarly, for the RF sensing, it may include UL transmission (e.g., transmitting reference signals), DL reception (e.g., receiving reflected reference signals), or both. For other non-data services, it may further include receiving radio frequency energy (e.g., for energy harvesting devices) or wireless charging signals (e.g., RF or laser beams, based on UE and network capability), transmitting radio frequency energy (e.g., charging other devices)—energy harvesting (EH) or laser beams based on capability, assisting RFID tag(s) (e.g., helping with transmitting RF signals for reading from one or more of RFID tags and/or helping with receiving RF signals for reading from one or more of RFID tags, etc., where RFID tags may include be passive/semi-passive IoT devices, ambient IoT devices, zero-power IoT devices, etc. In some examples, certain non-data services may specify frequency retuning similar to measurement gap.

Also, as described in connection with FIGS. 12A, 12B, and 13, the UE 1402 may monitor an LP-WUS using the LP-WUR 1406 and without turning on its main radio 1404. However, in some examples, the UE may also perform the monitoring of LP-WUS while its main radio 1404 is on/activated. For example, the UE 1402 may receive an LP-WUS during a first LP-WUS monitoring occasion that is associated with a first non-data service (e.g., perform RF sensing), which may specify the UE 1402 to activate (turn on) its main radio to perform the first non-data service. Then, while performing the first non-data service, the UE 1402 may be configured to continue monitoring for an LP-WUS, and the UE may receive a second LP-WUS during a second LP-WUS monitoring occasion, where the second LP-WUS and/or the second LP-WUS monitoring occasion may be associated with a second non-data service (e.g., perform RFID tag reading). Thus, in such scenarios, the UE 1402 may receive/monitor for an LP-WUS while its main radio 1404 is on/activated.

In another example, the UE 1402 may also be configured to use its LP-WUR 1406 (or to monitor for an LP-WUS using its LP-WUR 1406) and/or to turn off/deactivate/disable its main radio 1404 based on specified condition(s), such as on-demand or in response to receiving a request from an application or a network entity, or when the UE 1402 is in a specified sleep mode (e.g., in a deep sleep (DS) mode, in a light sleep mode, in a micro-sleep mode, in an ultra-low-power state sleep mode, etc.).

In another aspect of the present disclosure, the association between an LP-WUS (e.g., the LP0WUS 1408) and at least non-data service (which may be referred to as an "LP-non-data-service-WUS" in some examples) and/or the association between one or more LP-WUS monitoring occasions and at least non-data service may be configured for the UE 1402 via the main radio 1404 of the UE 1402. For example, a network entity (e.g., a base station) may configure LP-WUS monitoring occasions (MOs) for the UE 1402 via the main radio 1404 of the UE 1402, where the LP-WUS monitoring occasions may be periodic (e.g., configured through RRC signalling) or semi-persistent (e.g., configured through RRC signalling and activated by medium access control (MAC) control element (CE) (MAC-CE) or downlink control information (DCI)). In another example, the network entity may configure the LP-WUS monitoring occasions (MOs) for a device (e.g., the UE 1402) via layer 1 (L1), layer 2 (L2), and/or layer 3 (L3) signalling depending on the type and/or connection of the device. For example, if a Uu link is established between the network and the device, L1 signalling (e.g., DCI) may be used. If a Uu link/interface is used by the device, L2 signalling (e.g., MAC-CE) may be used. If an RRC connection is established between the network entity and the device, then L3 signalling (e.g., RRC signalling) may be used, etc. In some example, the LP-WUS monitoring occasions may also be configured for a device via sidelink, such as via sidelink control information (SCI), PC5-MAC-CE, and/or PC5-RRC, etc. In other examples, an interface/link may also be configured for a specified device for the configuration. For example, a dedicated interface/link may be designed for an energy harvesting (EH) device to enable the EH device to communicate with the network entity or another UE.

In some examples, the network entity and/or the UE 1402 may configure the LP-WUS monitoring occasions to be aligned with other occasions/cycles, such as low power radio service (LP-RS), LP-synchronization (LP-SS), LP-paging occasion (LP-PO), LP-DRX cycle, regular LP-WUSs, etc. In addition, the LP-WUS monitoring occasions may be reconfigured or adjusted, by the network entity or the UE 1402, based on the main radio 1404 and/or the LP-WUR 1406. For example, if the main radio 1404 is expected to be deactivated/turned off for an extended period of time, the periodicity and/or duration for the LP-WUS monitoring occasions may be modified.

In another aspect of the present disclosure, as an LP-WUS may include a payload such as shown at 1422, the LP-WUS may be configured to include information associated with a corresponding non-data service (e.g., the non-data service(s) 1410). For example, if an LP-WUS (e.g., the LP-WUS 1408) is configured to be associated with UE positioning, the LP-WUS (i.e., the payload section of the LP-WUS) may indicate the configuration of channel state information reference signal (CSI-RS) or SRS that is to be used for the UE positioning among a plurality of configurations configured for the main radio 1404.

In another example, as shown by the Table 3 below, a bitmap may be defined for an LP-WUS indicating which non-data service(s) is to be performed (e.g., RF sensing, RFID processing, etc.) and/or the priority of the non-data service(s) (e.g., to be used in case of configuration overlap of different non-data services and/or data services). In some implementations, the priorities may be Layer 1 (L1), Layer 2 (L2), and/or Layer 3 (L3) configured for the UE 1402 using the main radio 1404 or may be indicated to the UE 1402 using the LP-WUS monitored by the LP-WUR 1406 (e.g., as part of the payload of the LP-WUS 1408).

TABLE 3

Example bitmap indication for LP-WUS

| LP-non-data-service-WUS field content | Interpretation (e.g., non-data service(s) to be performed) |
|---|---|
| 00 | No action (e.g., no positioning and RF sensing) or perform data service |
| 01 | Perform RF sensing (e.g., no positioning) |
| 10 | Perform positioning (e.g., no RF sensing) |
| 11 | Perform both positioning and RF sensing |

In another aspect of the present disclosure, an LP-WUS (e.g., the LP-WUS 1408) may be configured to be associated with at least one non-data service (e.g., the non-data service(s) 1410) based on waveform(s) (which may be referred to as "LP-non-data-service-WUS waveform(s)" in some examples). For example, a dedicated signal may be used for an LP-non-data-service-WUS. Thus, if the UE 1402 receives an LP-WUS based on the dedicated signal, the UE 1402 may perform the corresponding non-data service(s). In another example, DCI-based (e.g., polar coded with physical downlink control channel (PDCCH) as physical (PHY) channel, different DCI formats, etc.) LP-non-data-service-WUS may be defined between an LP-WUS and non-data service(s). In another example, as shown by the Table 4 below, sequence-based signal(s) (e.g., discrete Fourier transform (DFT), Walsh, Reed-Solomon, Gold, m-sequence, Zadoff Chu, etc.) may be used for associating an LP-WUS with different non-data services.

TABLE 4

Example waveform indication for LP-WUS

| LP-non-data-service-WUS waveform(s) | Interpretation (e.g., non-data service(s) to be performed) |
|---|---|
| DFT code | No action (e.g., no positioning and RF sensing) or perform data service |
| Reed-Solomon code | Perform RF sensing (e.g., no positioning) |
| m-sequence code | Perform positioning (e.g., no RF sensing) |
| Zadoff Chu code | Perform both positioning and RF sensing |

In another example, signals (e.g., OFDM waveforms) with different modulations may be used for associating an LP-WUS with different non-data services. For example, as shown by the Table 5 below, on-off keying (OOK), amplitude-shift keying (ASK), frequency-shift keying (FSK), and/or chirp (e.g., linear frequency modulated waveform (LFMW) modulated signals/waveforms may be used for associating different non-data services for an LP-WUS. For example, an LP-WUS (e.g., an OFDM waveform) modulated based on OOK may be used for indicating the UE 1402 to perform RFID tag reading, whereas an LP-WUS modulated based on ASK modulation may be used for indicating the UE 1402 to transmit energy signal to RFID tag(s), etc.

TABLE 5

Example modulation indication for LP-WUS

| Modulation Methods | Interpretation (e.g., non-data service(s) to be performed) |
|---|---|
| OOK | Perform RFID tag(s) reading |
| ASK | Transmit energy signal to RFID tag(s) |
| FSK | Transmit energy signal to RFID tag(s) and receive reflected signal from the RFID tag(s) |
| Chirp | No action or perform data service |

In another aspect of the present disclosure, the configuration/association between an LP-WUS and at least one non-data service and/or between one or more LP-WUS monitoring occasions and at least one non-data service may be specific to the UE 1402, or to a group of UEs in a lower power (LP) state. For example, a network entity may transmit the configuration/association to a group of UEs, where the configuration/association is specific to this group of UEs. Thus, UE(s) within the group of UEs may perform the corresponding non-data service(s) in response to receiving an LP-WUS during the one or more LP-WUS monitoring occasions, whereas UE(s) not within the group of UEs may not perform the corresponding non-data service(s) if an LP-WUS is received (but may still activate their main radios for other purposes). Note that an LP-WUS that is associated with at least one non-data service (which may be referred to as an "LP-non-data-service-WUS") may be differentiated from an LP-WUS that is not associated with at least one non-data service (e.g., which may be referred to as a normal LP-WUS or an LP-data-service-WUS) based on a radio network temporary identifier (RNTI) and/or scrambling identifier (ID). In addition, different/new configuration and/or RNTI/scrambling ID may be defined to be specific to a UE (e.g., the UE 1402) or a group of UEs.

In another aspect of the present disclosure, a UE (e.g., the UE 1402) may be configured (e.g., by a network entity) to perform different behaviours upon detecting an LP-non-data-service-WUS. For example, the behaviours may include reception (Rx) behaviour and/or transmission (Tx) behaviours. As such, if a UE receives an LP-non-data-service-WUS, the UE may be specified to monitor a reception occasion (and using certain Rx configuration(s)) and/or to transmit a transmission occasion (and using certain Tx configuration(s)), etc. In some examples, information and/or configuration(s) related to receptions and/or transmissions (e.g., their corresponding behaviours) may be provided to the UE in advance (e.g., from a network entity) by means of RRC configuration and/or non-data service (e.g., RF sensing, positioning, RFID tag processing, etc.) entity protocol (e.g., similar/equivalent to LTE positioning protocol (LPP) that is used for positioning).

In another aspect of the present disclosure, a normal LP-WUS (e.g., an LP-data-service-WUS) may be configured to be associated with at least one non-data service. In other words, the LP-non-data-service-WUS indication may be included in an LP-data-service-WUS. For example, additional bits may be included in an LP-data-service-WUS to indicate a UE behaviour with respect to at least one non-data service and priorities, such as described in connection with Table 3. For example, two-bits (00) may be used for indicating a UE to perform data service, two-bits (01) may be used for indicating a UE to perform positioning, two-bits (10) may be used for indicating a UE to perform RF sensing, and/or two-bits (11) may be used for indicating a UE to perform RFID tag processing, etc. In addition, additional bits may further be added to include additional information for the non-data service(s). For example, an additional one-bit may be included to indicate the direction of transmission, e.g., bit-1 for UL transmission and bit-0 for DL reception. If the UE is also expected to perform both UL transmission and DL reception, a two-bit indication may be used, e.g., bit-01 for UL transmission, bit-10, for DL reception, and bit-11 for both UL transmission and DL reception, etc. Note while the examples above use UL transmissions and DL transmissions for showing aspects of the present disclosure, they are merely for illustration purposes. The transmission direction and/or certain non-data services may also apply to sidelink (SL) communications. For example, for a positioning session that is associated with SL transmission, bit-1 may be used for indicating a first UE to transmit a SL transmission to a second UE, and bit-0 may be used for indicating a first UE to receive a SL transmission from a second UE, etc.

Figure 15:
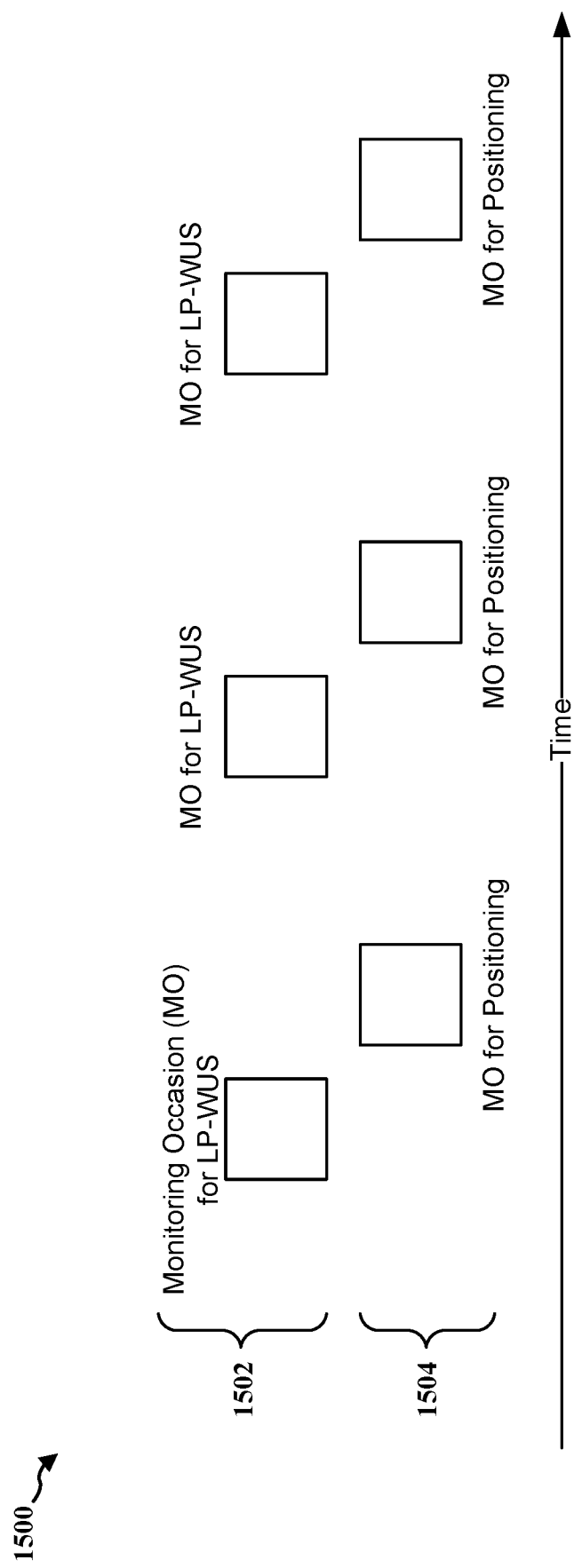
FIG. 15 is a diagram illustrating an example of associating certain LP-WUS monitoring occasions for non-data service(s) in accordance with various aspects of the present disclosure.

FIG. 15 is a diagram 1500 illustrating an example of associating certain LP-WUS monitoring occasions for non-data service(s) in accordance with various aspects of the present disclosure. As described in connection with FIG. 14, in some examples, certain LP-WUS monitoring occasions (MOs) in multiple LP-WUS MOs may be used for associating a non-data service. For example, as shown at 1502 of the diagram 1500, for a set of LP-WUS MOs, a first subset of LP-WUS MOs in the set of LP-WUS MOs may be configured for normal LP-WUS operation. Thus, if a UE detects an LP-WUS during the first subset of LP-WUS MOs, the UE may perform a default operation (e.g., a data service). As shown at 1504, a second subset of LP-WUS MOs in the set of LP-WUS MOs may be configured for at least one non-data service, such as positioning. Thus, if a UE detects an LP-WUS during the second subset of LP-WUS MOs, the UE may perform the corresponding non-data service(s), such as the positioning. Such configuration may enable an LP-WUS used for data service to be also used for the non-data service(s), thereby avoiding altering the format of the LP-WUS.

In another example, one or more reserved bits of an LP-WUS may also be used to indicate configuration(s) for the non-data services. For example, is an LP-WUS is associated with UE positioning, one or more reserved bits of an LP-WUS may be used for indicating a specified positioning method, such as described in connection with FIG. 4.

In another example, a UE (e.g., the UE 1402) may be configured to interpret a normal LP-WUS (e.g., an LP-data-service-WUS) for at least one non-data service (e.g., to perform the positioning or the RF sensing, etc.) without extra/additional LP-WUS indication (e.g., without using/adding additional bits to the payload of the LP-WUS). For example, as described in connection with FIGS. 14 and 15, certain monitoring occasions may be defined/dedicated to positioning (or RF sensing or other) and interpret the LP-WUS (meaning of bits) accordingly, e.g., the 1-bit indication to wake up may indicate the UE to wake up for positioning.

In another aspect of the present disclosure, a UE may be configured to receive multiple LP-WUSs for at least one non-data service, which may be referred to as a multi-stage LP-WUS. For example, a first LP-WUS may be used for indicating whether a UE is to perform a data service or a non-data service, and then a second LP-WUS may be used for indicating a corresponding data/non-data service to be performed by the UE (which may also include additional configurations and/or information associated with the corresponding data/non-data service).

Figure 16:
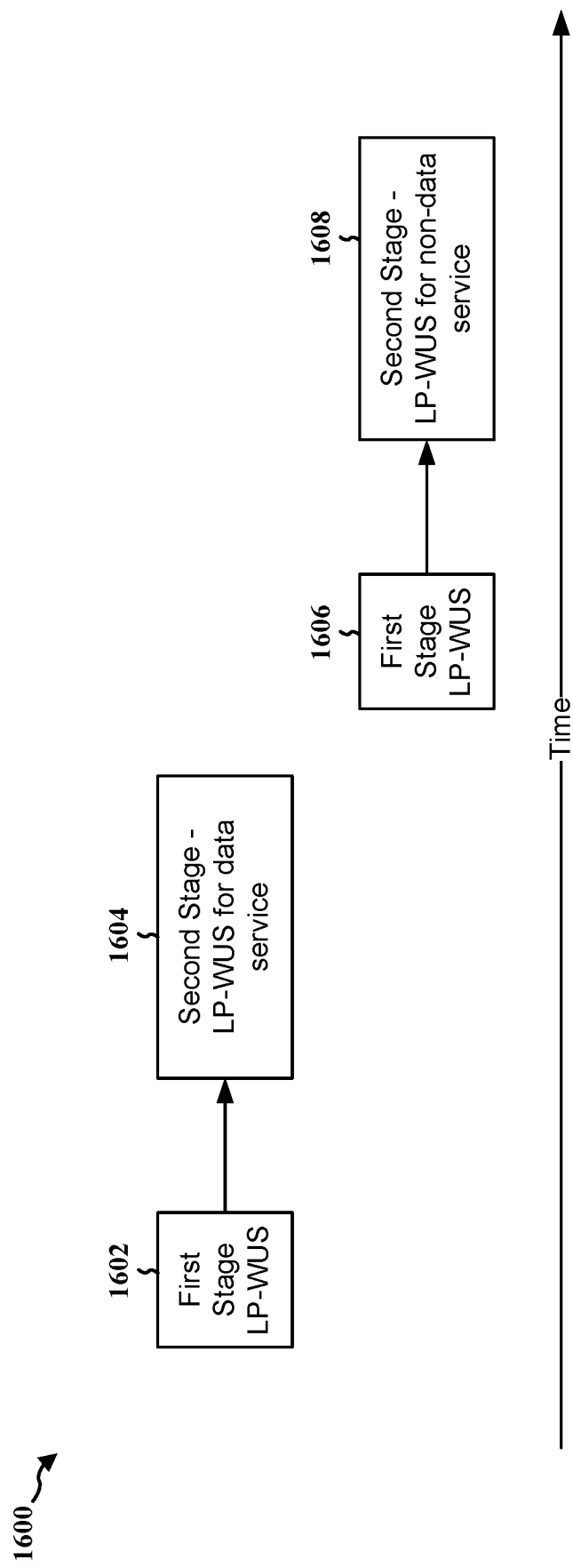
FIG. 16 is a diagram illustrating an example of a multi-stage WUS configuration in accordance with various aspects of the present disclosure.

FIG. 16 is a diagram 1600 illustrating an example of a multi-stage WUS configuration in accordance with various aspects of the present disclosure. In one example, a first LP-WUS transmitted to a UE (e.g., the UE 1402) may be used for indicating whether the UE is to perform a data service or a non-data service. Then, a second LP-WUS (e.g., a subsequent LP-WUS) transmitted to the UE may be used for indicating a specified data/non-data service to be performed by the UE and/or its associated configurations.

For example, as shown at 1602, a UE may receive a first LP-WUS that indicates the UE to perform a data service. Then, as shown at 1604, the UE may receive a second LP-WUS that indicates the UE to perform a specified data service and/or that includes configuration(s) for the data service(s) (e.g., to perform an UL transmission, a DL reception, and/or a SL transmission/reception, etc.). Similarly, as shown at 1606, a UE may receive a first LP-WUS that indicates the UE to perform a non-data service. Then, as shown at 1608, the UE may receive a second LP-WUS that indicates the UE to perform a specified non-data service, such as UE positioning or RF sensing, etc. The second LP-WUS may also include configuration(s) for the non-data service(s). For example, a network entity (e.g., a base station) may indicate a direction of the non-data service (e.g., to perform an UL transmission, a DL reception, both the UL transmission and the DL reception, and/or a SL transmission/reception, etc.) among which CSI-RS, PRS, SRS, and/or other types of reference signal resource(s) or configuration(s) are to be used by the UE. In some examples, the network entity may also indicate a time (e.g., an exact time) for the UE to start monitoring/communicating (e.g., performing corresponding Tx/Rx) using its main radio (e.g., which may be after the transition time expected by the UE if the network entity has the knowledge about the UE's sleep type and/or its associated transition time (e.g., time to activate the main radio).

In some examples, if the network entity has data to transmit to the UE, the network entity may use the first LP-WUS to indicate to the UE that a data service is performed by the UE, such as shown at 1602, and then the network entity may transmit the data to the UE after the UE activates its main radio. In this example, the UE may not be configured to monitor for a second LP-WUS, but may monitor for the data from the network entity (e.g., using its main radio).

The indication in the first LP-WUS (e.g., for indicating the data/non-data service) and/or the indication in the second LP-WUS (e.g., for indicating a specified data/non-data service and/or its corresponding configuration(s)) may be in form of a format, a payload indicating format, a type, and/or a sequence among several sequences, etc., such as described in connection with Tables 3 to 5.

Figure 17:
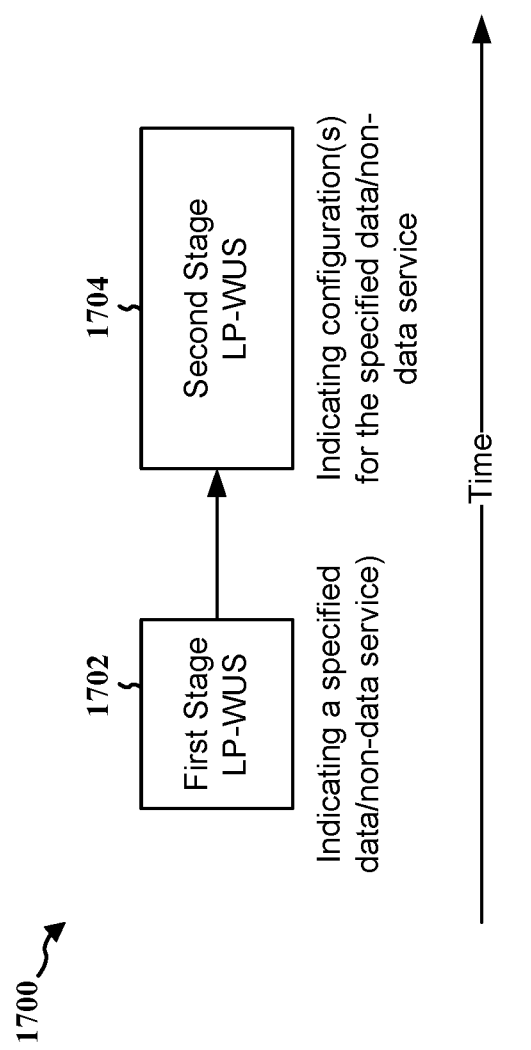
FIG. 17 is a diagram illustrating an example of a multi-stage WUS configuration in accordance with various aspects of the present disclosure.

In another example, as shown by a diagram 1700 of FIG. 17, a first LP-WUS may be used for indicating a specified data service or a specified non-data service (e.g., RF sensing, UE positioning, RFID tag processing, etc.), and the second stage LP-WUS may be used for indicating information and/or configuration associated with the specified data/non-data service. For example, at 1702, the first LP-WUS may indicate to the UE that RF sensing is to be performed by the UE. Then, at 1704, the second LP-WUS may indicate to the UE to transmit radar reference signal(s) using a specified waveform and/or to receive reflected radar reference signal(s), etc.

In some examples, there may be several design aspects for configuring LP-WUS monitoring occasions (or monitoring occasions of LP-non-data-service-WUS) for a UE (or for a group of UEs). In one design aspect, a network entity may indicate the transmission direction and/or type (e.g., UL/DL/SL Tx/Rx) of the indicated non-data service(s) among which resources (e.g., CSI-RS, PRS, and/or SRS resources, etc.) or configuration(s) are be used associated with the indicated non-data service(s) using same LP-WUS monitoring occasions. Each non-data service may have its own associated parameters and configurations. This information may be packed based on what data/non-data services are to be performed by the UE, and the UE may be configured (or based on a specification/pre-configuration) to know how to interpret the payload for each combination of service information. For example, the UE may be configured to know/determine that the second LP-WUS is going to be X bits in length if the first LP-WUS indicates the UE to perform UE positioning, and the UE may also be configured to know/determine that the second LP-WUS is going to be X bits plus Y bits in length if the first LP-WUS indicates the UE to perform both the positioning and the RF sensing (e.g., the first X bits may be related to the UE positioning and the rest Y bits may be related to the RF sensing configuration(s), parameter(s), and/or related services.

In another design aspect, different LP-WUS monitoring occasions may be associated with different services (e.g., for each data/non-data service or for a group of non-data services, etc.), such as described in connection with FIG. 15. Under such configuration, it may be easier for a UE to determine/expect a corresponding service. For example, if a set of LP-WUS monitoring occasions is configured to be associated with UE positioning, the UE may expect the LP-WUS to be X bits in length. On the other hand, if a set of LP-WUS monitoring occasions is configured to be associated with RF sensing, the UE may expect the LP-WUS to be Y bits in length. In some examples, the network entity may indicate to the UE an exact time for the UE to start monitoring or performing non-data service(s) using its main radio (e.g., if the network entity knows the UE's sleep type and/or its associated transition time for activating its main radio, etc.).

Figure 18:
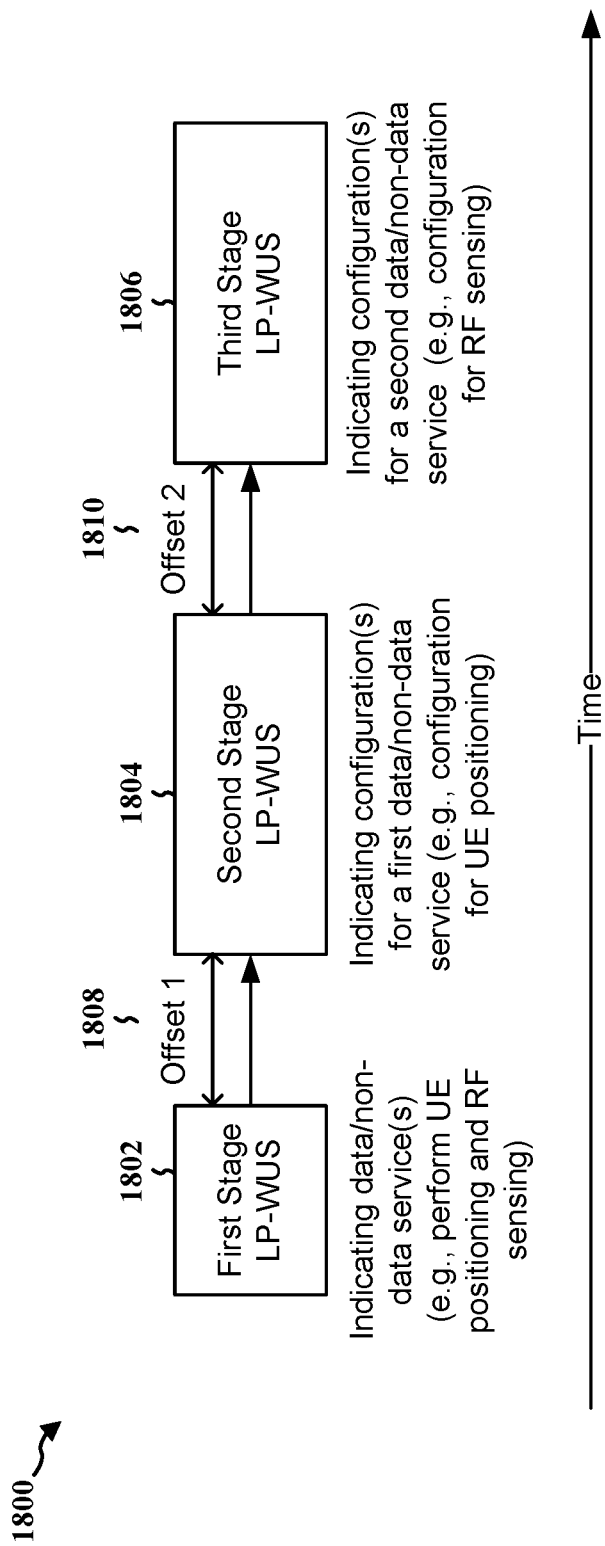
FIG. 18 is a diagram illustrating an example of a multi-stage WUS configuration in accordance with various aspects of the present disclosure.

FIG. 18 is a diagram 1800 illustrating an example of a multi-stage WUS configuration in accordance with various aspects of the present disclosure. In some examples, more than two LP-WUSs may be used for indicating additional information associated with the data/non-data service(s) indicated in the first LP-WUS. For example, as shown at 1802, a first LP-WUS may indicate a UE to perform both UE positioning and RF sensing. Then, as shown at 1804 and 1806, a second LP-WUS may indicate configuration(s) associated with the UE positioning and a third LP-WUS may indicate configuration(s) associated with the RF sensing, etc. In some examples, as shown at 1808 and 1810, different LP-WUSs may be transmitted (by the network entity) with different time offsets (or with a specified time offset) between two LP-WUSs. The time offset(s) may be determined based on a UE's capability (e.g., the UE's capability to process/perform positioning, RF sensing, and RFID tag reading, etc.), thereby reducing errors associated with insufficient time offsets (e.g., not having enough time to perform the non-data service(s)). In some examples, the time offset(s), which may also be referred to as gap(s), may be configured to be at least a function of the receiver type (e.g., the receiver type of the LP-WUR), and/or a function of a clock accuracy among other hardware/firmware/software/ radio frequency specifications. In other examples, the time offset may also be zero (e.g., there is no time offset between LP-WUSs).

Figure 19:
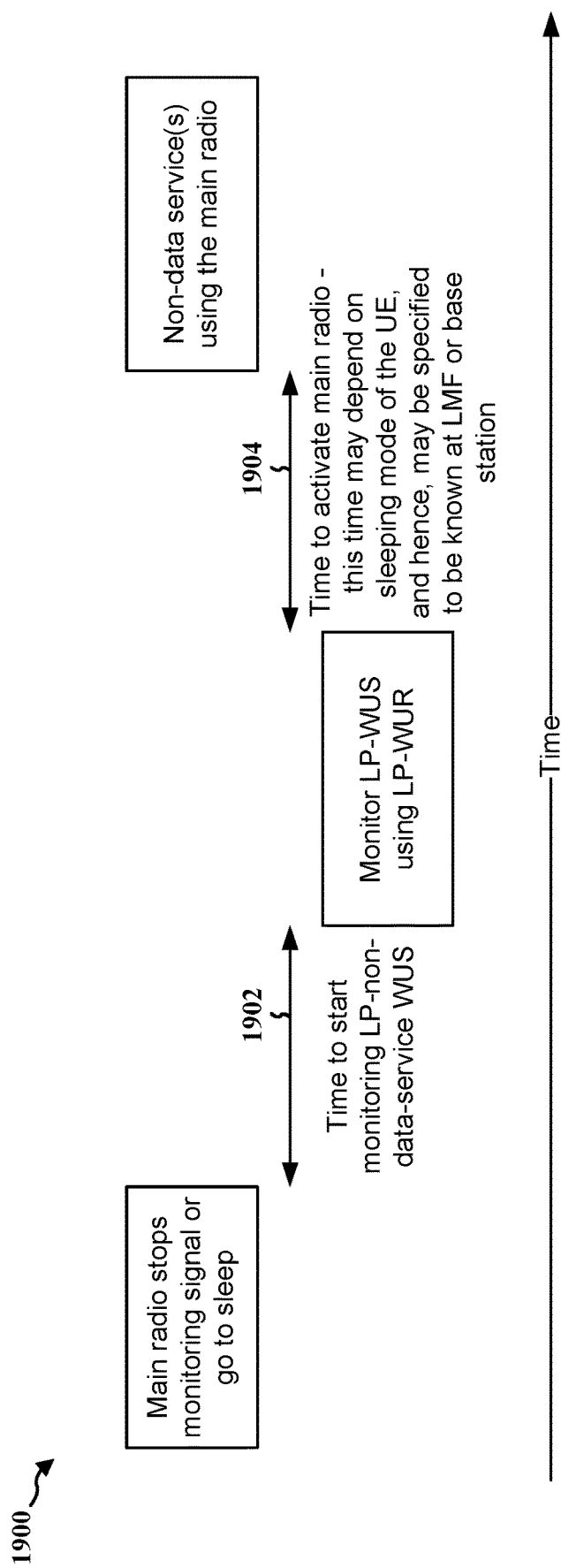
FIG. 19 is a diagram illustrating an example delay associated with activating or deactivating a main radio of a UE in accordance with various aspects of the present disclosure.

FIG. 19 is a diagram 1900 illustrating an example delay associated with activating/deactivating a main radio of a UE in accordance with various aspects of the present disclosure. In another aspect of the present disclosure, in order for a network entity (e.g., a base station, a location server, a location management function (LMF) to determine proper time to transmit LP-WUR (e.g., an LP-non-data-service-WUS) and/or to start communicate with a UE based on the main radio of the UE, the network entity may be configured to determine (or specified to know) the sleeping mode and/or the transition time of the UE. Thus, the network entity may determine the delay associated with the wake-up time of the UE, and/or determine whether to select a specific UE for one or more non-data service(s).

For example, a UE may indicate to an LMF (or an RF sensing entity in case of RF sensing) the sleeping mode/pattern of the UE. The UE may also indicate the sleeping mode/pattern to a serving base station of the UE, and the serving base station may forward/transmit the sleeping mode/pattern of the UE to the LMF. As shown at 1902 and 1904, a sleeping mode/pattern may refer to a pattern or a sequence of a sleeping mode and time where they occur, such as the transition time for an LP-WUR to start monitoring for an LP-WUS (e.g., after the main radio stops or goes to sleep) and/or the transmission time for the main radio to activate (e.g., for using in association with the non-data service(s)) after receiving an LP-WUS. In some examples, a UE may indicate its sleeping mode/pattern dynamically, such as via its main radio before the UE enters into a sleep mode.

Figure 20:
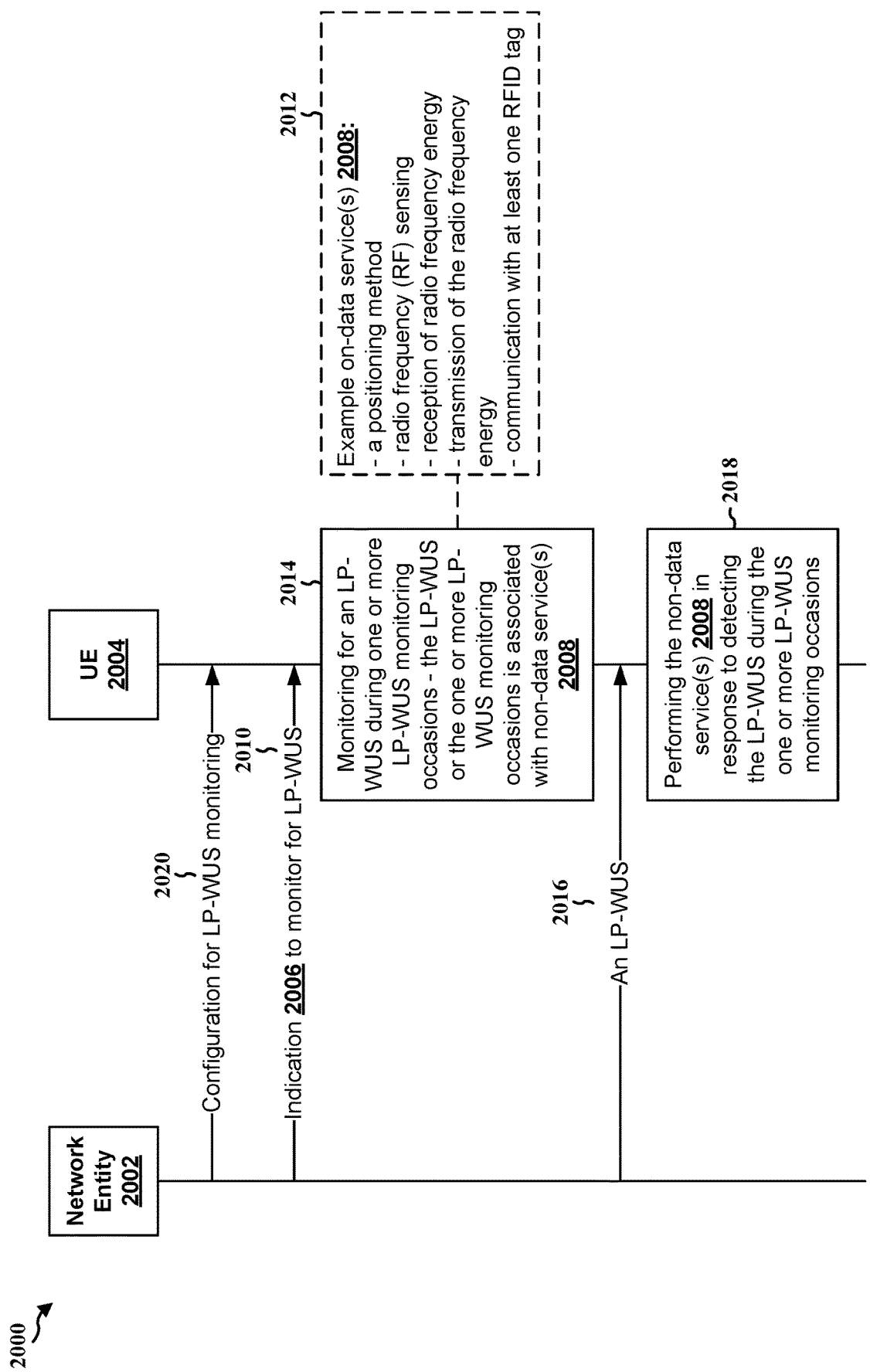
FIG. 20 is a communication flow illustrating an example of a network entity indicating to a UE to perform a non-data service based on using an LP-WUS in accordance with various aspects of the present disclosure.

FIG. 20 is a communication flow 2000 illustrating an example of a network entity indicating to a UE to perform a non-data service based on using an LP-WUS in accordance with various aspects of the present disclosure. The numberings associated with the communication flow 2000 do not specify a particular temporal order and are merely used as references for the communication flow 2000.

At shown at 2010, a network entity 2002 (e.g., a base station, a location server, an LMF, etc.) may transmit an indication 2006 to a UE 2004 to indicate the UE 2004 to monitor for an LP-WUS during one or more LP-WUS monitoring occasions, where the LP-WUS and/or the one or more LP-WUS monitoring occasions may be associated with one or more non-data service(s) 2008, such as described in connection with FIG. 14. As shown at 2012, the non-data service(s) 2008 may include a positioning method, RF sensing, reception of radio frequency energy, transmission of the radio frequency energy, communication with at least one RFID tag, or a combination thereof. In some examples, the indication 2006 may be transmitted to a group of UEs, such as UEs in a low power state.

At 2014, based on the indication 2006, the UE 2004 may monitor for a LP-WUS (using its LP-WUR) during one or more LP-WUS monitoring occasions. The one or more LP-WUS monitoring occasions may be configured to be periodic or semi-persistent (e.g., via RRC signalling, and activated via a MAC-CE or DCI (for semi-persistent configuration)).

At 2016, if the network entity 2002 is requesting the UE 2004 to perform the non-data service(s) 2008, the network entity 2002 may transmit an LP-WUS to the UE 2004. In some examples, the LP-WUS may include information associated with the non-data service(s) 2008, such as described in connection with FIG. 14. In one example, the LP-WUS may be associated with at least one of: a dedicated signal or waveform, a dedicated DCI format, a dedicated coding method, or a dedicated modulation method.

At 2018, in response to the LP-WUS from the network entity 2002, the UE 2004 may perform the non-data service(s) 2008, such as described in connection with FIG. 14. For example, the UE 2004 may activate its main radio if the LP-WUS is detected, where the non-data service(s) 2008 is performed via the main radio of the UE 2004. In some examples, the UE 2004 may also receive the LP-WUS while its main radio is active or is in an RRC connected mode.

In some examples, the UE 2004 may determine a priority between multiple non-data services in the non-data service(s) 2008 based on a bitmap associated with the LP-WUS or the one or more LP-WUS monitoring occasions, and the UE 2004 may perform one or more non-data services in the non-data service(s) 2008 based on the priority.

In some implementations, as shown at 2020, the network entity 2002 may transmit a configuration to the UE 2004 for monitoring the LP-WUS during the one or more LP-WUS monitoring occasions, where the configuration may include at least one of a reception behaviour or a transmission behaviour of the UE 2004. In another example, as described in connection with FIG. 19, the UE 2004 may transmit, to the network entity 2002, an indication of a sleep mode of the UE 2004 or a pattern of the UE 2004. Then, the UE 2004 may receive the configuration to monitor for the LP-WUS from the network entity 2002 based on the sleep mode or the pattern. The network entity 2002 may transmit the configuration to the UE 2004 via L1/L2/L3 signalling, via sidelink (e.g., PC5 signalling), and/or via a dedicated (e.g., new) link/interface (e.g., designed for energy harvesting device, passive IoT device, etc.).

Figure 21:
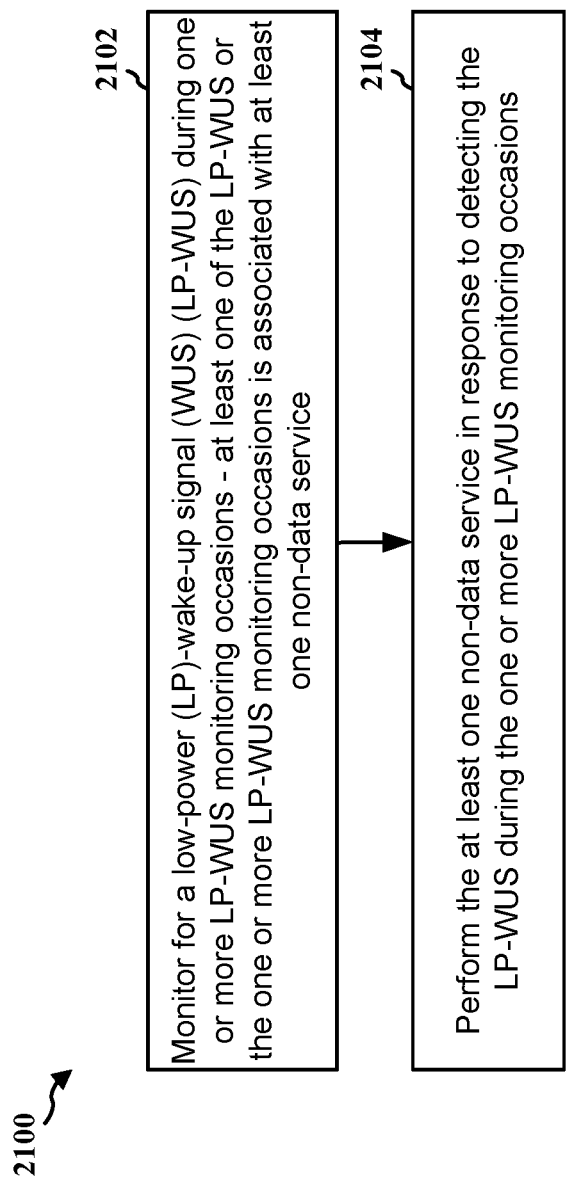
FIG. 21 is a flowchart of a method of wireless communication.

FIG. 21 is a flowchart 2100 of a method of wireless communication. The method may be performed by a UE (e.g., the UE 104, 404, 1202, 1402, 2004; the apparatus 2204). The method may enable the UE to monitor for one or more LP-WUSs during one or more LP-WUS monitoring occasions using an LP-WUR, and perform one or more non-data services in response to receive one or more LP-WUSs during one or more LP-WUS monitoring occasions (e.g., using its main radio).

At 2102, the UE may monitor for a LP-WUS during one or more LP-WUS monitoring occasions, where at least one of the LP-WUS or the one or more LP-WUS monitoring occasions is associated with at least one non-data service, such as described in connection with FIGS. 14 and 20. For example, at 2014 of FIG. 20, the UE 2004 may monitor for an LP-WUS during one or more LP-WUS monitoring occasions, where the LP-WUS or the one or more LP-WUS monitoring occasions may be associated with non-data service(s) 2008. The monitoring of the LP-WUS may be performed by, e.g., the LP-WUR component 198, the cellular baseband processor 2224, and/or the transceiver(s) 2222 of the apparatus 2204 in FIG. 22.

At 2104, the UE may perform the at least one non-data service in response to detecting the LP-WUS during the one or more LP-WUS monitoring occasions, such as described in connection with FIGS. 14 and 20. For example, at 2018 of FIG. 20, the UE 2004 may perform the non-data service(s) 2008 in response to detecting the LP-WUS during the one or more LP-WUS monitoring occasions. The at least one non-data service may be performed by, e.g., the LP-WUR component 198, the cellular baseband processor 2224, and/or the transceiver(s) 2222 of the apparatus 2204 in FIG. 22.

In one example, the at least one non-data service may include: a positioning method, radio frequency sensing, reception of radio frequency energy, transmission of the radio frequency energy, communication with at least one radio frequency identification (RFID) tag, or a combination thereof.

In another example, the LP-WUS may include information associated with the at least one non-data service.

In another example, the LP-WUS may be monitored using an LP-WUR circuitry while an MR circuitry of the UE is deactivated or in an RRC idle or RRC inactive mode. In some implementations, the UE may activate the MR circuitry if the LP-WUS is detected, where the at least one non-data service is performed via the MR circuitry.

In another example, the LP-WUS may be monitored using a LP-WUR circuitry while a MR circuitry of the UE is active or in an RRC connected mode.

In another example, the one or more LP-WUS monitoring occasions may be configured to be periodic or semi-persistent (e.g., via RRC signalling, and activated via a MAC-CE or DCI).

In another example, the LP-WUS may include an indication of a reference signal configuration in a plurality of reference signal configurations to be used for the at least one non-data service.

In another example, the UE may determine a priority between multiple non-data services in the at least one non-data service based on a bitmap associated with the LP-WUS or the one or more LP-WUS monitoring occasions, and the UE may perform one or more non-data services in the at least one non-data service based on the priority.

In another example, the LP-WUS may be associated with at least one of: a dedicated signal or waveform, a dedicated DCI format, a dedicated coding method, or a dedicated modulation method.

In another example, the UE may receive, from a network entity, a configuration to monitor for the LP-WUS during the one or more LP-WUS monitoring occasions, where the configuration may include at least one of a reception behaviour or a transmission behaviour of the UE. The configuration may be received via L1/L2/L3 signalling, via sidelink (e.g., PC5 signalling), and/or via a dedicated (e.g., new) link/interface.

In another example, the UE may transmit, for a network entity, an indication of a sleep mode of the UE or a pattern of the UE, and the UE may receive, from the network entity, a configuration to monitor for the LP-WUS during the one or more LP-WUS monitoring occasions based on the sleep mode or the pattern.

In another example, the LP-WUS may include an indication that the at least one non-data service is to be performed by the UE, and the UE may receive a second LP-WUS that includes additional information associated with the at least one non-data service to be performed by the UE, such as described in connection with FIGS. 16 to 18.

Figure 22:
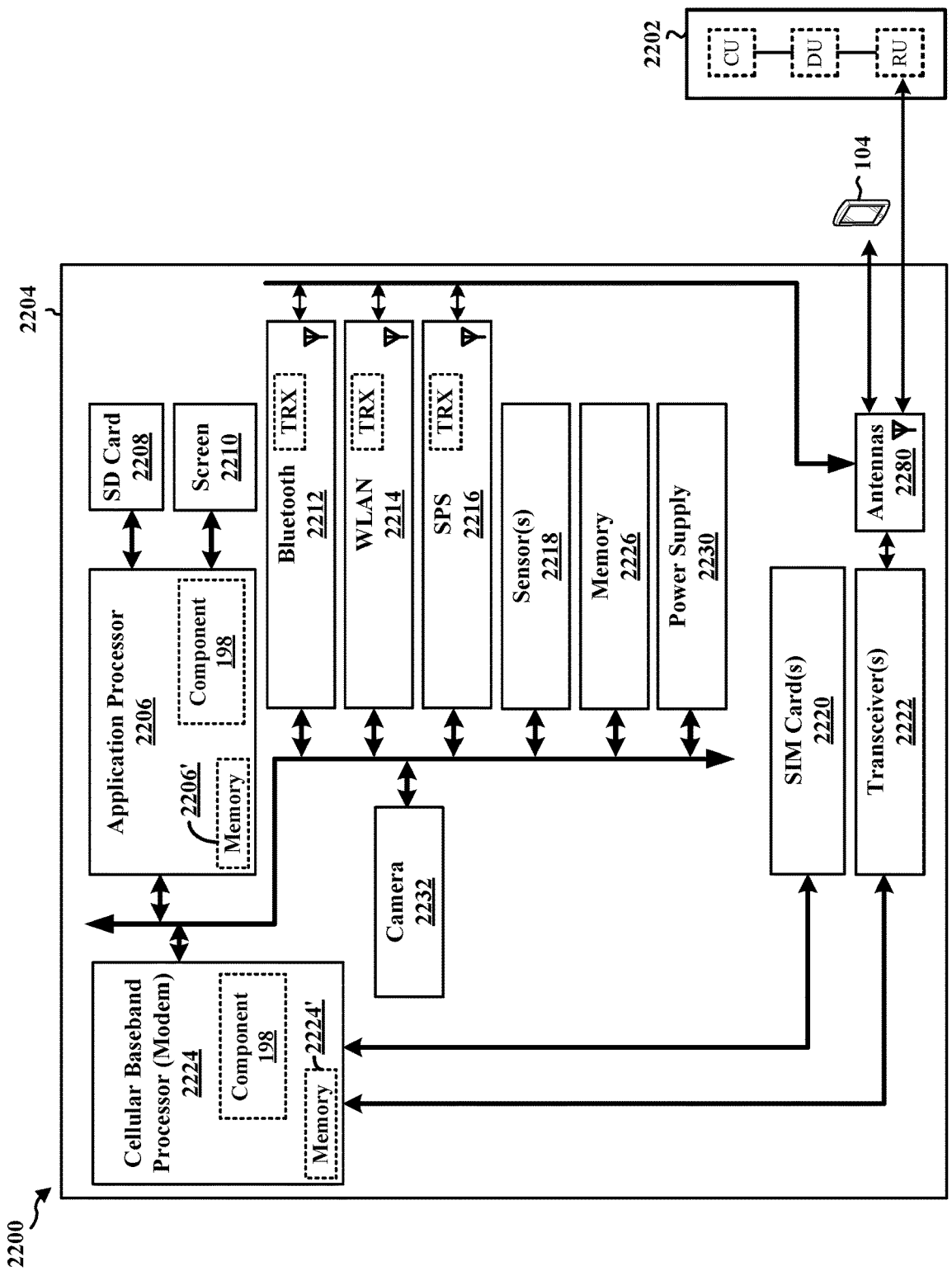
FIG. 22 is a diagram illustrating an example of a hardware implementation for an example apparatus and/or network entity.

FIG. 22 is a diagram 2200 illustrating an example of a hardware implementation for an apparatus 2204. The apparatus 2204 may be a UE, a component of a UE, or may implement UE functionality. In some aspects, the apparatus 2204 may include a cellular baseband processor 2224 (also referred to as a modem) coupled to one or more transceivers 2222 (e.g., cellular RF transceiver). The cellular baseband processor 2224 may include on-chip memory 2224'. In some aspects, the apparatus 2204 may further include one or more subscriber identity modules (SIM) cards 2220 and an application processor 2206 coupled to a secure digital (SD) card 2208 and a screen 2210. The application processor 2206 may include on-chip memory 2206'. In some aspects, the apparatus 2204 may further include a Bluetooth module 2212, a WLAN module 2214, an SPS module 2216 (e.g., GNSS module), one or more sensor modules 2218 (e.g., barometric pressure sensor/altimeter; motion sensor such as inertial measurement unit (IMU), gyroscope, and/or accelerometer(s), magnetometer, audio and/or other technologies used for positioning), additional memory modules 2226, a power supply 2230, and/or a camera 2232. The Bluetooth module 2212, the WLAN module 2214, and the SPS module 2216 may include an on-chip transceiver (TRX) (or in some cases, just a receiver (RX)). The Bluetooth module 2212, the WLAN module 2214, and the SPS module 2216 may include their own dedicated antennas and/or utilize the antennas 2280 for communication. The cellular baseband processor 2224 communicates through the transceiver(s) 2222 via one or more antennas 2280 with the UE 104 and/or with an RU associated with a network entity 2202. The cellular baseband processor 2224 and the application processor 2206 may each include a computer-readable medium/memory 2224',2206', respectively. The additional memory modules 2226 may also be considered a computer-readable medium/memory. Each computer-readable medium/memory 2224', 2206', 2226 may be non-transitory. The cellular baseband processor 2224 and the application processor 2206 are each responsible for general processing, including the execution of software stored on the computer-readable medium/memory. The software, when executed by the cellular baseband processor 2224/application processor 2206, causes the cellular baseband processor 2224/application processor 2206 to perform the various functions described supra. The computer-readable medium/memory may also be used for storing data that is manipulated by the cellular baseband processor 2224/application processor 2206 when executing software. The cellular baseband processor 2224/application processor 2206 may be a component of the UE 350 and may include the memory 360 and/or at least one of the TX processor 368, the RX processor 356, and the controller/processor 359. In one configuration, the apparatus 2204 may be a processor chip (modem and/or application) and include just the cellular baseband processor 2224 and/or the application processor 2206, and in another configuration, the apparatus 2204 may be the entire UE (e.g., see 350 of FIG. 3) and include the additional modules of the apparatus 2204.

As discussed supra, the LP-WUR component 198 is configured to monitor for a LP-WUS during one or more LP-WUS monitoring occasions, where at least one of the LP-WUS or the one or more LP-WUS monitoring occasions is associated with at least one non-data service. The LP-WUR component 198 may also be configured to perform the at least one non-data service in response to detecting the LP-WUS during the one or more LP-WUS monitoring occasions. The LP-WUR component 198 may be within the cellular baseband processor 2224, the application processor 2206, or both the cellular baseband processor 2224 and the application processor 2206. The LP-WUR component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 2204 may include a variety of components configured for various functions. In one configuration, the apparatus 2204, and in particular the cellular baseband processor 2224 and/or the application processor 2206, includes means for monitoring for a LP-WUS during one or more LP-WUS monitoring occasions, where at least one of the LP-WUS or the one or more LP-WUS monitoring occasions is associated with at least one non-data service. The apparatus 2204 may further include means for performing the at least one non-data service in response to detecting the LP-WUS during the one or more LP-WUS monitoring occasions.

In one configuration, the at least one non-data service may include: a positioning method, radio frequency sensing, reception of radio frequency energy, transmission of the radio frequency energy, communication with at least one RFID tag, or a combination thereof.

In another configuration, the LP-WUS may include information associated with the at least one non-data service.

In another configuration, the LP-WUS may be monitored using an LP-WUR circuitry while an MR circuitry of the UE is deactivated or in an RRC idle or RRC inactive mode. In some implementations, the apparatus 2204 may further include means for activating the MR circuitry if the LP-WUS is detected, where the at least one non-data service is performed via the MR circuitry.

In another configuration, the LP-WUS may be monitored using a LP-WUR circuitry while a MR circuitry of the UE is active or in an RRC connected mode.

In another configuration, the one or more LP-WUS monitoring occasions may be configured to be periodic or semi-persistent.

In another configuration, the LP-WUS may include an indication of a reference signal configuration in a plurality of reference signal configurations to be used for the at least one non-data service.

In another configuration, the apparatus 2204 may further include means for determining a priority between multiple non-data services in the at least one non-data service based on a bitmap associated with the LP-WUS or the one or more LP-WUS monitoring occasions, and means for performing one or more non-data services in the at least one non-data service based on the priority.

In another configuration, the LP-WUS may be associated with at least one of: a dedicated signal or waveform, a dedicated DCI format, a dedicated coding method, or a dedicated modulation method.

In another configuration, the apparatus 2204 may further include means for receiving, from a network entity, a configuration to monitor for the LP-WUS during the one or more LP-WUS monitoring occasions, where the configuration may include at least one of a reception behaviour or a transmission behaviour of the UE.

In another configuration, the apparatus 2204 may further include means for transmitting, for a network entity, an indication of a sleep mode of the UE or a pattern of the UE, and means for receiving, from the network entity, a configuration to monitor for the LP-WUS during the one or more LP-WUS monitoring occasions based on the sleep mode or the pattern.

In another configuration, the LP-WUS may include an indication that the at least one non-data service is to be performed by the UE, and the apparatus 2204 may further include means for receiving a second LP-WUS that includes additional information associated with the at least one non-data service to be performed by the UE, such as described in connection with FIGS. 16 to 18.

The means may be the LP-WUR component 198 of the apparatus 2204 configured to perform the functions recited by the means. As described supra, the apparatus 2204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 23:
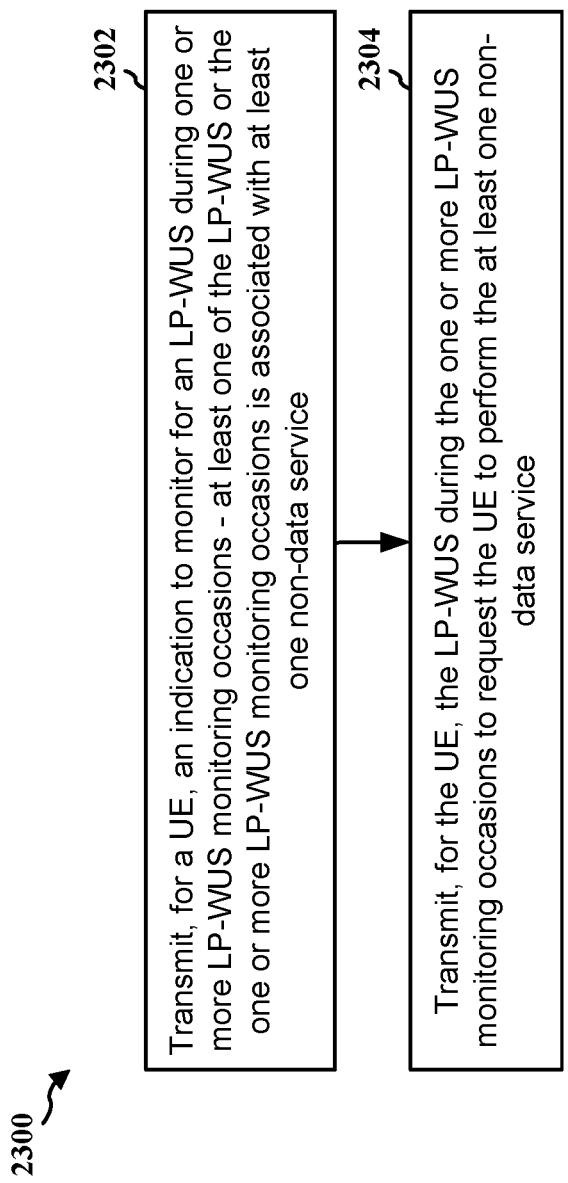
FIG. 23 is a flowchart of a method of wireless communication.

FIG. 23 is a flowchart 2300 of a method of wireless communication. The method may be performed by a network entity (e.g., the base station 102; the network entity 2002, 2402. The method may enable the network entity to configure a UE to monitor for one or more LP-WUSs during one or more LP-WUS monitoring occasions, and to perform one or more non-data services in response to receive one or more LP-WUSs during one or more LP-WUS monitoring occasions.

At 2302, the base station may transmit, for a UE, an indication to monitor for an LP-WUS during one or more LP-WUS monitoring occasions, where at least one of the LP-WUS or the one or more LP-WUS monitoring occasions is associated with at least one non-data service, such as described in connection with FIGS. 14 and 20. For example, at 2010 of FIG. 20, the network entity 2002 may transmit, to the UE 2004, an indication 2006 to monitor for an LP-WUS during one or more LP-WUS monitoring occasions, where at least one of the LP-WUS or the one or more LP-WUS monitoring occasions is associated with the non-data service(s) 2008. The transmission of the indication may be performed by, e.g., the non-data service indication component 199 and/or the transceiver(s) 2446 of the network entity 2402 in FIG. 24.

At 2304, the base station may transmit, for the UE, the LP-WUS during the one or more LP-WUS monitoring occasions to request the UE to perform the at least one non-data service, such as described in connection with FIGS. 14 and 20. For example, at 2016 of FIG. 20, the network entity 2002 may transmit, to the UE 2004, an LP-WUS during the one or more LP-WUS monitoring occasions to request the UE 2004 to perform the non-data service(s) 2008. The transmission of the LP-WUS may be performed by, e.g., the non-data service indication component 199 and/or the transceiver(s) 2446 of the network entity 2402 in FIG. 24.

In one example, the at least one non-data service may include: a positioning method, radio frequency sensing, reception of radio frequency energy, transmission of the radio frequency energy, communication with at least one RFID tag, or a combination thereof.

In another example, the LP-WUS may include information associated with the at least one non-data service.

In another example, the one or more LP-WUS monitoring occasions may be configured to be periodic or semi-persistent.

In another example, the LP-WUS may include an indication of a reference signal configuration in a plurality of reference signal configurations to be used for the at least one non-data service.

In another example, the LP-WUS may be associated with at least one of: a dedicated signal or waveform, a dedicated DCI format, a dedicated coding method, or a dedicated modulation method.

In another example, the indication to monitor for the LP-WUS during the one or more LP-WUS monitoring occasions may be transmitted to a group of UEs in an LP state.

In another example, the network entity may transmit, for the UE, a configuration to monitor for the LP-WUS during the one or more LP-WUS monitoring occasions, where the configuration may include at least one of a reception behavior or a transmission behavior of the UE.

In another example, the network entity may receive an indication of a sleep mode of the UE or a pattern of the UE, and the network entity may transmit, for the UE, a configuration to monitor for the LP-WUS during the one or more LP-WUS monitoring occasions based on the indication.

In another example, the LP-WUS may include an indication that the at least one non-data service is to be performed by the UE, and the network entity may transmit, for the UE, a second LP-WUS that includes additional information associated with the at least one non-data service to be performed by the UE.

Figure 24:
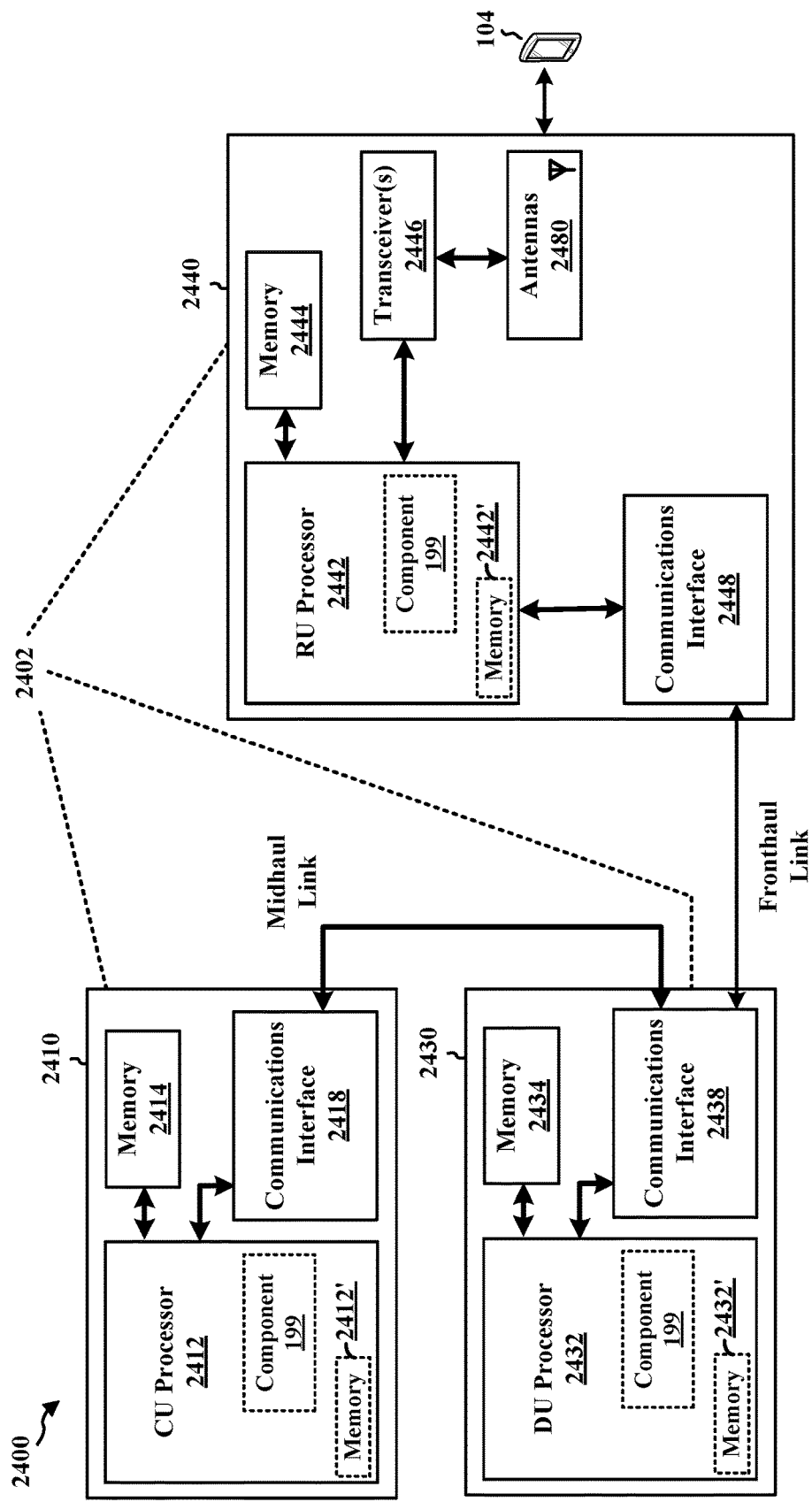
FIG. 24 is a diagram illustrating an example of a hardware implementation for an example apparatus and/or network entity.

FIG. 24 is a diagram 2400 illustrating an example of a hardware implementation for a network entity 2402. The network entity 2402 may be a BS, a component of a BS, or may implement BS functionality. The network entity 2402 may include at least one of a CU 2410, a DU 2430, or an RU 2440. For example, depending on the layer functionality handled by the non-data service indication component 199, the network entity 2402 may include the CU 2410; both the CU 2410 and the DU 2430; each of the CU 2410, the DU 2430, and the RU 2440; the DU 2430; both the DU 2430 and the RU 2440; or the RU 2440. The CU 2410 may include a CU processor 2412. The CU processor 2412 may include on-chip memory 2412'. In some aspects, the CU 2410 may further include additional memory modules 2414 and a communications interface 2418. The CU 2410 communicates with the DU 2430 through a midhaul link, such as an F1 interface. The DU 2430 may include a DU processor 2432. The DU processor 2432 may include on-chip memory 2432'. In some aspects, the DU 2430 may further include additional memory modules 2434 and a communications interface 2438. The DU 2430 communicates with the RU 2440 through a fronthaul link. The RU 2440 may include an RU processor 2442. The RU processor 2442 may include on-chip memory 2442'. In some aspects, the RU 2440 may further include additional memory modules 2444, one or more transceivers 2446, antennas 2480, and a communications interface 2448. The RU 2440 communicates with the UE 104. The on-chip memory 2412', 2432', 2442' and the additional memory modules 2414, 2434, 2444 may each be considered a computer-readable medium/memory. Each computer-readable medium/memory may be non-transitory. Each of the processors 2412, 2432, 2442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the non-data service indication component 199 is configured to transmit, for a UE, an indication to monitor for an LP-WUS during one or more LP-WUS monitoring occasions, where at least one of the LP-WUS or the one or more LP-WUS monitoring occasions is associated with at least one non-data service. The non-data service indication component 199 may also be configured to transmit, for the UE, the LP-WUS during the one or more LP-WUS monitoring occasions to request the UE to perform the at least one non-data service. The non-data service indication component 199 may be within one or more processors of one or more of the CU 2410, DU 2430, and the RU 2440. The non-data service indication component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 2402 may include a variety of components configured for various functions. In one configuration, the network entity 2402 includes means for transmitting, for a UE, an indication to monitor for an LP-WUS during one or more LP-WUS monitoring occasions, where at least one of the LP-WUS or the one or more LP-WUS monitoring occasions is associated with at least one non-data service. The network entity 2402 may further include means for transmitting, for the UE, the LP-WUS during the one or more LP-WUS monitoring occasions to request the UE to perform the at least one non-data service.

In one configuration, the at least one non-data service may include: a positioning method, radio frequency sensing, reception of radio frequency energy, transmission of the radio frequency energy, communication with at least one RFID tag, or a combination thereof.

In another configuration, the LP-WUS may include information associated with the at least one non-data service.

In another configuration, the one or more LP-WUS monitoring occasions may be configured to be periodic or semi-persistent.

In another configuration, the LP-WUS may include an indication of a reference signal configuration in a plurality of reference signal configurations to be used for the at least one non-data service.

In another configuration, the LP-WUS may be associated with at least one of: a dedicated signal or waveform, a dedicated DCI format, a dedicated coding method, or a dedicated modulation method.

In another configuration, the indication to monitor for the LP-WUS during the one or more LP-WUS monitoring occasions may be transmitted to a group of UEs in an LP state.

In another configuration, the network entity 2402 may further include means for transmitting, for the UE, a configuration to monitor for the LP-WUS during the one or more LP-WUS monitoring occasions, where the configuration may include at least one of a reception behavior or a transmission behavior of the UE.

In another configuration, network entity 2402 may further include means for receiving an indication of a sleep mode of the UE or a pattern of the UE, and means for transmitting, for the UE, a configuration to monitor for the LP-WUS during the one or more LP-WUS monitoring occasions based on the indication.

In another configuration, the LP-WUS may include an indication that the at least one non-data service is to be performed by the UE, and the network entity 2402 may further include means for transmitting, for the UE, a second LP-WUS that includes additional information associated with the at least one non-data service to be performed by the UE.

The means may be the non-data service indication component 199 of the network entity 2402 configured to perform the functions recited by the means. As described supra, the network entity 2402 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including: monitoring for an LP-WUS during one or more LP-WUS monitoring occasions, where at least one of the LP-WUS or the one or more LP-WUS monitoring occasions is associated with at least one non-data service; and performing the at least one non-data service in response to detecting the LP-WUS during the one or more LP-WUS monitoring occasions.

Aspect 2 is the method of aspect 1, where the at least one non-data service includes: a positioning method, radio frequency sensing, reception of radio frequency energy, transmission of the radio frequency energy, communication with at least one RFID tag, or a combination thereof.

Aspect 3 is the method of aspect 1 or 2, where the LP-WUS includes information associated with the at least one non-data service.

Aspect 4 is the method of any of aspects 1 to 3, where the LP-WUS is monitored using an LP-WUR circuitry while a MR circuitry of the UE is deactivated or in an RRC idle or RRC inactive mode.

Aspect 5 is the method of aspect 4, further including: activating the MR circuitry if the LP-WUS is detected, where the at least one non-data service is performed via the MR circuitry.

Aspect 6 is the method of any of aspects 1 to 5, where the LP-WUS is monitored using an LP-WUR circuitry while a MR circuitry of the UE is active or in an RRC connected mode.

Aspect 7 is the method of any of aspects 1 to 6, where the one or more LP-WUS monitoring occasions are configured to be periodic or semi-persistent.

Aspect 8 is the method of any of aspects 1 to 7, where the LP-WUS includes an indication of a reference signal configuration in a plurality of reference signal configurations to be used for the at least one non-data service.

Aspect 9 is the method of any of aspects 1 to 8, further including: determining a priority between multiple non-data services in the at least one non-data service based on a bitmap associated with the LP-WUS or the one or more LP-WUS monitoring occasions; and performing one or more non-data services in the at least one non-data service based on the priority.

Aspect 10 is the method of any of aspects 1 to 9, where the LP-WUS is associated with at least one of: a dedicated signal or waveform, a dedicated DCI format, a dedicated coding method, or a dedicated modulation method.

Aspect 11 is the method of any of aspects 1 to 10, further including: receiving, from a network entity, a configuration to monitor for the LP-WUS during the one or more LP-WUS monitoring occasions, where the configuration includes at least one of a reception behavior or a transmission behavior of the UE.

Aspect 12 is the method of any of aspects 1 to 11, further including: transmitting, for a network entity, an indication of a sleep mode of the UE or a pattern of the UE; and receiving, from the network entity, a configuration to monitor for the LP-WUS during the one or more LP-WUS monitoring occasions based on the sleep mode or the pattern.

Aspect 13 is the method of any of aspects 1 to 12, where the LP-WUS includes an indication that the at least one non-data service is to be performed by the UE, the method further including: receiving a second LP-WUS that includes additional information associated with the at least one non-data service to be performed by the UE.

Aspect 14 is an apparatus for wireless communication at a UE, including: a memory; and at least one processor coupled to the memory and, based at least in part on information stored in the memory, the at least one processor is configured to implement any of aspects 1 to 13.

Aspect 15 is the apparatus of aspect 14, further including at least one of a transceiver or an antenna coupled to the at least one processor.

Aspect 16 is an apparatus for wireless communication including means for implementing any of aspects 1 to 13.

Aspect 17 is a computer-readable medium (e.g., a non-transitory computer-readable medium) storing computer executable code, where the code when executed by a processor causes the processor to implement any of aspects 1 to 13.

Aspect 18 is a method of wireless communication at a network entity, including: transmitting, for a UE, an indication to monitor for an LP-WUS during one or more LP-WUS monitoring occasions, where at least one of the LP-WUS or the one or more LP-WUS monitoring occasions is associated with at least one non-data service; and transmitting, for the UE, the LP-WUS during the one or more LP-WUS monitoring occasions to request the UE to perform the at least one non-data service.

Aspect 19 is the method of aspect 18, where the at least one non-data service includes: a positioning method, radio frequency sensing, reception of radio frequency energy, transmission of the radio frequency energy, communication with at least one RFID tag, or a combination thereof.

Aspect 20 is the method of aspect 18 or aspect 19, where the LP-WUS includes information associated with the at least one non-data service.

Aspect 21 is the method of any of aspects 18 to 20, where the one or more LP-WUS monitoring occasions are configured to be periodic or semi-persistent.

Aspect 22 is the method of any of aspects 18 to 21, where the LP-WUS includes an indication of a reference signal configuration in a plurality of reference signal configurations to be used for the at least one non-data service.

Aspect 23 is the method of any of aspects 18 to 22, where the LP-WUS is associated with at least one of: a dedicated signal or waveform, a dedicated DCI format, a dedicated coding method, or a dedicated modulation method.

Aspect 24 is the method of any of aspects 18 to 23, where the indication to monitor for the LP-WUS during the one or more LP-WUS monitoring occasions is transmitted to a group of UEs in an LP state.

Aspect 25 is the method of any of aspects 18 to 24, further including: transmitting, for the UE, a configuration to monitor for the LP-WUS during the one or more LP-WUS monitoring occasions, where the configuration includes at least one of a reception behavior or a transmission behavior of the UE.

Aspect 26 is the method of any of aspects 18 to 25, further including: receiving an indication of a sleep mode of the UE or a pattern of the UE; and transmitting, for the UE, a configuration to monitor for the LP-WUS during the one or more LP-WUS monitoring occasions based on the indication.

Aspect 27 is the method of any of aspects 18 to 26, where the LP-WUS includes an indication that the at least one non-data service is to be performed by the UE, the method further including: transmitting, for the UE, a second LP-WUS that includes additional information associated with the at least one non-data service to be performed by the UE.

Aspect 28 is an apparatus for wireless communication at a network entity, including: a memory; and at least one processor coupled to the memory and, based at least in part on information stored in the memory, the at least one processor is configured to implement any of aspects 18 to 27.

Aspect 29 is the apparatus of aspect 28, further including at least one of a transceiver or an antenna coupled to the at least one processor.

Aspect 30 is an apparatus for wireless communication including means for implementing any of aspects 18 to 27.

Aspect 31 is a computer-readable medium (e.g., a non-transitory computer-readable medium) storing computer executable code, where the code when executed by a processor causes the processor to implement any of aspects 18 to 27.

What is claimed is:

1. An apparatus for wireless communication at a user equipment (UE), comprising:
    at least one memory; and
    at least one processor coupled to the at least one memory and, based at least in part on information stored in the at least one memory, the at least one processor is configured to:
        monitor for a first low-power (LP)-wake-up signal (WUS) (LP-WUS) during one or more LP-WUS monitoring occasions, wherein the first LP-WUS is associated with at least one non-data service, wherein the at least one non-data service includes a positioning method, radio frequency sensing, reception of radio frequency energy, transmission of the radio frequency energy, communication with at least one radio frequency identification (RFID) tag, or a combination thereof;
        perform the at least one non-data service in response to detecting the first LP-WUS during the one or more LP-WUS monitoring occasions, wherein the first LP-WUS includes an indication that the at least one non-data service is to be performed by the UE; and
        receive a second LP-WUS that includes additional information associated with the at least one non-data service to be performed by the UE, wherein the additional information is not included in the first LP-WUS.

2. The apparatus of claim 1, wherein the first LP-WUS includes first information associated with the at least one non-data service.

3. The apparatus of claim 1, wherein the at least one processor is configured to monitor the first LP-WUS using a LP wake-up radio (WUR) (LP-WUR) circuitry while a main radio (MR) circuitry of the UE is deactivated or in a radio resource control (RRC) idle or RRC inactive mode.

4. The apparatus of claim 3, wherein the at least one processor is further configured to:
    activate the MR circuitry if the first LP-WUS is detected, wherein the at least one processor is configured to perform the at least one non-data service via the MR circuitry.

5. The apparatus of claim 1, wherein the at least one processor is configured to monitor the first LP-WUS using a LP wake-up radio (WUR) (LP-WUR) circuitry while a main radio (MR) circuitry of the UE is active or in a radio resource control (RRC) connected mode.

6. The apparatus of claim 1, wherein the one or more LP-WUS monitoring occasions are configured to be periodic or semi-persistent.

7. The apparatus of claim 1, wherein the first LP-WUS includes an indication of a reference signal configuration in a plurality of reference signal configurations to be used for the at least one non-data service.

8. The apparatus of claim 1, wherein the at least one processor is further configured to:
determine a priority between multiple non-data services in the at least one non-data service based on a bitmap associated with the first LP-WUS or the one or more LP-WUS monitoring occasions; and
perform one or more non-data services in the at least one non-data service based on the priority.

9. The apparatus of claim 1, wherein the LP-WUS is associated with at least one of:
a dedicated signal or waveform,
a dedicated downlink control information (DCI) format,
a dedicated coding method, or
a dedicated modulation method.

10. The apparatus of claim 1, wherein the at least one processor is further configured to:
receive, from a network entity, a configuration to monitor for the first LP-WUS during the one or more LP-WUS monitoring occasions, wherein the configuration includes at least one of a reception behavior or a transmission behavior of the UE.

11. The apparatus of claim 1, wherein the at least one processor is further configured to:
transmit, for a network entity, an indication of a sleep mode of the UE or a pattern of the UE; and
receive, from the network entity, a configuration to monitor for the first LP-WUS during the one or more LP-WUS monitoring occasions based on the sleep mode or the pattern.

12. A method of wireless communication at a user equipment (UE), comprising:
monitoring for a first low-power (LP)-wake-up signal (WUS) (LP-WUS) during one or more LP-WUS monitoring occasions, wherein the LP-WUS is associated with at least one non-data service, wherein the at least one non-data service includes a positioning method, radio frequency sensing, reception of radio frequency energy, transmission of the radio frequency energy, communication with at least one radio frequency identification (RFID) tag, or a combination thereof;
performing the at least one non-data service in response to detecting the first LP-WUS during the one or more LP-WUS monitoring occasions, wherein the LP-WUS includes an indication that the at least one non-data service is to be performed by the UE; and
receiving a second LP-WUS that includes additional information associated with the at least one non-data service to be performed by the UE, wherein the additional information is not included in the first LP-WUS.

13. The method of claim 12, wherein the first LP-WUS is monitored using a LP wake-up radio (WUR) (LP-WUR) circuitry while a main radio (MR) circuitry of the UE is deactivated or in a radio resource control (RRC) idle or RRC inactive mode the method further comprises:
activating the MR circuitry if the LP-WUS is detected, wherein the at least one non-data service is performed via the MR circuitry.

14. The method of claim 12, further comprising:
determining a priority between multiple non-data services in the at least one non-data service based on a bitmap associated with the first LP-WUS or the one or more LP-WUS monitoring occasions; and
performing one or more non-data services in the at least one non-data service based on the priority.

15. The method of claim 12, further comprising:
receiving, from a network entity, a configuration to monitor for the first LP-WUS during the one or more LP-WUS monitoring occasions, wherein the configuration includes at least one of a reception behavior or a transmission behavior of the UE.

16. An apparatus for wireless communication at a network entity, comprising:
at least one memory; and
at least one processor coupled to the at least one memory and, based at least in part on information stored in the at least one memory, the at least one processor is configured to:
transmit, for a user equipment (UE), an indication to monitor for a first low-power (LP)-wake-up signal (WUS) (LP-WUS) during one or more LP-WUS monitoring occasions, wherein the first LP-WUS is associated with at least one non-data service, wherein the at least one non-data service includes a positioning method, radio frequency sensing, reception of radio frequency energy, transmission of the radio frequency energy, communication with at least one radio frequency identification (RFID) tag, or a combination thereof;
transmit, for the UE, the first LP-WUS during the one or more LP-WUS monitoring occasions to request the UE to perform the at least one non-data service, wherein the first LP-WUS includes an indication that the at least one non-data service is to be performed by the UE; and
transmit, for the UE, a second LP-WUS that includes additional information associated with the at least one non-data service to be performed by the UE, wherein the additional information is not included in the first LP-WUS.

17. The apparatus of claim 16, wherein the first LP-WUS includes first information associated with the at least one non-data service.

18. The apparatus of claim 16, wherein the one or more LP-WUS monitoring occasions are configured to be periodic or semi-persistent.

19. The apparatus of claim 16, wherein the first LP-WUS includes a second indication of a reference signal configuration in a plurality of reference signal configurations to be used for the at least one non-data service.

20. The apparatus of claim 16, wherein the first LP-WUS is associated with at least one of:
a dedicated signal or waveform,
a dedicated downlink control information (DCI) format,
a dedicated coding method, or
a dedicated modulation method.

21. The apparatus of claim 16, wherein the at least one processor is configured to transmit the indication to monitor for the first LP-WUS during the one or more LP-WUS monitoring occasions to a group of UEs in an LP state.

22. The apparatus of claim 16, wherein the at least one processor is further configured to:
transmit, for the UE, a configuration to monitor for the first LP-WUS during the one or more LP-WUS monitoring occasions, wherein the configuration includes at least one of a reception behavior or a transmission behavior of the UE.

23. The apparatus of claim 16, wherein the at least one processor is further configured to:
- receive a second indication of a sleep mode of the UE or a pattern of the UE; and
- transmit, for the UE, a configuration to monitor for the first LP-WUS during the one or more LP-WUS monitoring occasions based on the indication.

24. A method of wireless communication at a network entity, comprising:
- transmitting, for a user equipment (UE), an indication to monitor for a first low-power (LP)-wake-up signal (WUS) (LP-WUS) during one or more LP-WUS monitoring occasions, wherein the first LP-WUS is associated with at least one non-data service, wherein the at least one non-data service includes a positioning method, radio frequency sensing, reception of radio frequency energy, transmission of the radio frequency energy, communication with at least one radio frequency identification (RFID) tag, or a combination thereof;
- transmitting, for the UE, the LP-WUS during the one or more LP-WUS monitoring occasions to request the UE to perform the at least one non-data service, wherein the LP-WUS includes an indication that the at least one non-data service is to be performed by the UE; and
- transmitting, for the UE, a second LP-WUS that includes additional information associated with the at least one non-data service to be performed by the UE, wherein the additional information is not included in the first LP-WUS.

25. The method of claim 24, further comprising:
- transmitting, for the UE, a configuration to monitor for the first LP-WUS during the one or more LP-WUS monitoring occasions, wherein the configuration includes at least one of a reception behavior or a transmission behavior of the UE.

26. The method of claim 24, further comprising:
- receiving a second indication of a sleep mode of the UE or a pattern of the UE; and
- transmitting, for the UE, a configuration to monitor for the first LP-WUS during the one or more LP-WUS monitoring occasions based on the indication.

* * * * *